US012645223B2

(12) United States Patent
Okamori et al.

(10) Patent No.: US 12,645,223 B2
(45) Date of Patent: Jun. 2, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Atsushi Okamori, Tokyo (JP); Kento Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 491 days.

(21) Appl. No.: 18/007,481

(22) PCT Filed: Jul. 26, 2021

(86) PCT No.: PCT/JP2021/027497
§ 371 (c)(1),
(2) Date: Jan. 31, 2023

(87) PCT Pub. No.: WO2022/049918
PCT Pub. Date: Mar. 10, 2022

(65) Prior Publication Data
US 2023/0273621 A1      Aug. 31, 2023

(30) Foreign Application Priority Data

Sep. 3, 2020     (JP) ................................. 2020-148083

(51) Int. Cl.
G05D 1/00          (2024.01)
G01C 21/34         (2006.01)

(52) U.S. Cl.
CPC ....... G05D 1/0289 (2013.01); G01C 21/3453 (2013.01)

(58) Field of Classification Search
CPC ........................... G05D 1/0289; G01C 21/3453
(Continued)

(56) References Cited

U.S. PATENT DOCUMENTS

2019/0381662 A1* 12/2019  Taira ...................... B25J 13/089
2020/0026305 A1*  1/2020  Maekawa ............ G05D 1/0289
(Continued)

FOREIGN PATENT DOCUMENTS

JP        2015-230675  A      12/2015
JP        2019-36073  A       3/2019
(Continued)

OTHER PUBLICATIONS

International Search Report and Written Opinion mailed on Sep. 28, 2021, received for PCT Application PCT/JP2021/027497, filed on Jul. 26, 2021, 10 pages including English Translation.

*Primary Examiner* — Helal A Algahaim
*Assistant Examiner* — John D Holman
(74) *Attorney, Agent, or Firm* — XSENSUS LLP

(57)          ABSTRACT

A route/track planning unit (37) of a server (30) performs processing of determining a passing point having the highest moving efficiency within a non-interference range with other moving apparatuses in a moving direction from a track starting point of a moving apparatus toward a destination, processing of setting a track from the track starting point to the passing point having the highest moving efficiency, and processing of updating the track starting point to the passing point having the highest moving efficiency. Furthermore, the route/track planning unit (37) repeats these processes until the passing point having the highest moving efficiency becomes the destination, thereby generating a track plan indicating a track for moving efficiently to the destination. The track plan generated by the route/track planning unit (37) is transmitted to the moving apparatus via the communication unit. The server (30) can efficiently operate the moving apparatus (20).

20 Claims, 13 Drawing Sheets

(58) Field of Classification Search
USPC .......................................................... 701/414
See application file for complete search history.

(56) References Cited

U.S. PATENT DOCUMENTS

| | | | | |
|---|---|---|---|---|
| 2020/0386567 A1* | 12/2020 | Igarashi | ............. | G01C 21/3815 |
| 2023/0280164 A1* | 9/2023 | Kikkawa | ............. | G05D 1/0214 |
| | | | | 701/26 |

FOREIGN PATENT DOCUMENTS

| | | | |
|---|---|---|---|
| JP | 2020-77387 A | 5/2020 |
| WO | 2009/102970 A2 | 8/2009 |

* cited by examiner

: BOUNDARY LINE (NUMBER OF LANES 1)

: BOUNDARY LINE (NUMBER OF LANES 2)

: NODE (NUMBER OF LANES 1)

: NODE (NUMBER OF LANES 2)

: EDGE (NUMBER OF LANES 1)

: EDGE (NUMBER OF LANES 2)

: NODE (NUMBER OF LANES 1)

: NODE (NUMBER OF LANES 2)

: EDGE (NUMBER OF LANES 1)

: EDGE (NUMBER OF LANES 2)

: WP (NUMBER OF LANES 1)

: EDGE (NUMBER OF LANES 1)

(a)

(b)

● : WP (NUMBER OF LANES 1)

──── : EDGE (NUMBER OF LANES 1)

FIG. 12

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2021/027497, filed Jul. 26, 2021, which claims priority to Japanese Application No. 2020-148083, filed Sep. 3, 2020, the entire contents of each are incorporated herein by reference.

TECHNICAL FIELD

This technology relates to an information processing apparatus, an information processing method, and a program, and enables efficient operation of moving apparatuses.

BACKGROUND ART

Conventionally, a system using moving apparatuses has been used for various purposes, for example, conveyance of articles, inspection of facilities, security, and the like. In order for a moving apparatus to move, it is necessary to reach the destination so as not to collide with static and dynamic obstacles (including other moving robots) on the environment. Therefore, for example, in Patent Document 1, a manager generates and updates a map indicating an arbitrary environment in which a plurality of robots operates, and provides data used by one or a plurality of robots in the environment.

CITATION LIST

Patent Document

Patent Document 1: WO 2009/102970 A

SUMMARY OF THE INVENTION

Problems to be Solved by the Invention

By the way, in a case where the width of the movable region is wide, the manager can easily let moving apparatuses pass each other or the like by providing a plurality of lanes and specifying the lanes on which the moving apparatuses move. Furthermore, if the manager configures lanes using passing points (hereinafter referred to as "waypoints") that are coordinate positions through which the moving apparatuses should pass and allows the moving apparatuses to pass waypoint sequences indicating the lanes, it is possible to let the plurality of moving apparatuses pass each other or the like without performing conflict control.

However, when a lane is designated, a moving apparatus cannot shorten the moving distance to the destination by, for example, passing through an inner lane than the designated lane. Furthermore, if many waypoints are provided to perform detailed movement control, the moving apparatus has a large burden of track control using the waypoints. Therefore, the manager may not be able to efficiently operate the moving apparatuses.

Therefore, an object of this technology is to provide an information processing apparatus, an information processing method, and a program that enable efficient operation of moving apparatuses.

Solutions to Problems

A first aspect of the present technology is an information processing apparatus including a track planning unit that generates a track plan indicating a track to a destination by determining a passing point having a highest moving efficiency within a non-interference range with another moving apparatus in a moving direction from a track starting point of a moving apparatus toward the destination, setting a track from the track starting point to the passing point having the highest moving efficiency, and updating the track starting point to the passing point having the highest moving efficiency.

In this technology, the track planning unit determines the passing point having the highest moving efficiency within the non-interference range with the other moving apparatus in the moving direction from the track starting point of the moving apparatus, which is a setting target of the track, toward the destination. The non-interference range is specified on the basis of the position of the other moving apparatus when the moving apparatus moves from the track starting point to the determination passing point of the moving efficiency. For example, nodes are set in routes on which the moving apparatus and the other moving apparatus move, and the track planning unit specifies the non-interference range on the basis of the node closest to the determination passing point in the moving direction and the node closest to the other moving apparatus in the moving direction.

The track planning unit specifies the non-interference range for the own lane on which the moving apparatus moves, and sets the determination passing point as the passing point having the highest moving efficiency in a case where the moving distance is shortened by thinning passing points located between the track starting point and the determination passing point of the moving efficiency, for example. Furthermore, in a case where there is no obstacle between the track starting point and the determination passing point at which the moving distance is shortened by thinning a passing point, the determination passing point is set as the passing point having the highest moving efficiency.

Furthermore, the track planning unit may specify the non-interference range for the own lane in which the moving apparatus moves and another lane in which the other moving apparatus moves. In this case, the track planning unit determines the passing point having the highest moving efficiency from the passing point on the own lane and the passing point on the other lane included in the non-interference range. In a case where the track starting point is on the other lane and the next passing point on the other lane is not in the non-interference range, the track planning unit sets the determination passing point for determining the moving efficiency or the track starting point as the passing point on the own lane.

A second aspect of the present technology is an information processing method including generating, by a track planning unit, a track plan indicating a track to a destination by determining a passing point having a highest moving efficiency within a non-interference range with another moving apparatus in a moving direction from a track starting point of a moving apparatus toward the destination, setting a track from the track starting point to the passing point having the highest moving efficiency, and updating the track starting point to the passing point having the highest moving efficiency.

A third aspect of the present technology is a program for causing a computer to generate a track plan for a moving apparatus, the program causing the computer to execute:

a procedure of determining a passing point having a highest moving efficiency within a non-interference range with another moving apparatus in a moving direction from a track starting point of the moving apparatus toward a destination;

a procedure of setting a track from the track starting point to the passing point having the highest moving efficiency; and a procedure of updating the track starting point to the passing point having the highest moving efficiency.

Note that the program of the present technology is, for example, a program that can be provided to a general-purpose computer capable of executing various programs or codes by a storage medium provided in a computer-readable format, a communication medium, for example, a storage medium such as an optical disk, a magnetic disk, a semiconductor memory, or the like, or a communication medium such as a network or the like. By providing such a program in a computer-readable format, processing according to the program is implemented on the computer.

BRIEF DESCRIPTION OF DRAWINGS

FIG. 12 is a diagram illustrating a specific example of track planning in a case where lane change is performed.

MODE FOR CARRYING OUT THE INVENTION

Hereinafter, modes for carrying out the present technology will be described. Note that the description will be given in the following order.

1. Configuration of Moving Apparatus Control System
2. Configuration of Moving Apparatus and Server
3. Operation of Server
3-1. Operation for Generating Lane Map
3-2. Operation for Generating Track Plan
3-3. Another Operation for Generating Track Plan
4. Application Example

4

1. Configuration of Moving Apparatus Control System

Figure 1:
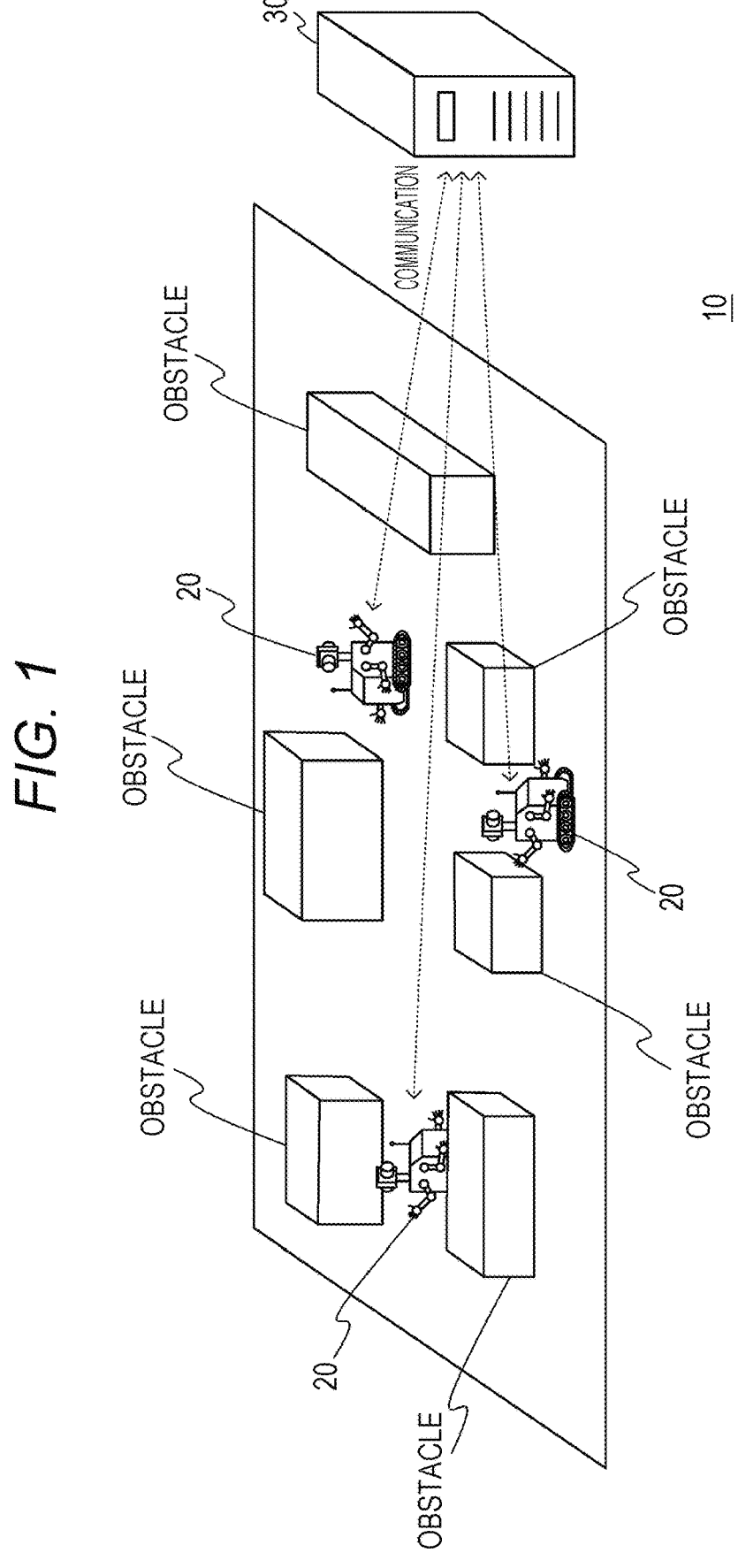
FIG. 1 is a diagram illustrating a configuration of a moving apparatus control system.

FIG. 1 illustrates a configuration of a moving apparatus control system. A moving apparatus control system 10 includes a plurality of moving apparatuses 20 and a server 30.

In the moving apparatus control system 10, the server 30 receives a moving task performed using a moving apparatus 20, and the server 30 generates a track plan for executing the moving task and provides the track plan to the moving apparatus 20. The moving apparatus 20 executes the moving task by moving on the track indicated by the track plan supplied from the server 30.

The moving task is a task that involves movement of the moving apparatus 20, which is a robot, an automated guided vehicle (AGV), a vehicle, or the like. Furthermore, the moving task may be performed by an arbitrary moving apparatus, a moving apparatus having a predetermined function or capability, a designated moving apparatus, or the like. Moreover, the moving task may be to simply reach a certain point and perform a task (such as inspection or the like), may be to further move to another point (such as conveyance or the like), or the like.

The server 30 performs task planning to determine to which moving apparatus the moving task input from the user or the like is to be assigned (or whether to change an existing assignment). The task planning may use various methods without particular limitation. For example, in a case where an arbitrary moving apparatus is used, a method of selecting a free moving apparatus closest to a destination of a moving task, a method of selecting a moving apparatus having the smallest number of assigned tasks in a case where there is no free moving apparatus, or the like is used.

The server 30 decides a moving apparatus to which a moving task is assigned and generates a track plan based on the lane map. The lane map is generated on the basis of the route map. The route map is expressed as, for example, a topological map including a relay node group as an intermediate destination candidate in the environment and an edge group connecting relay nodes directly accessible to each other. In the lane map, edges equal in number to the number of lanes that the moving apparatus can pass through at each node are provided, nodes (hereinafter, also referred to as waypoints) are set at both ends, and the number of lanes of the waypoint and the edge is set to one.

The track plan decides which waypoint to pass between the current location and the destination on the basis of the lane map. The track plan selects waypoints using, for example, a method such as Dijkstra's algorithm or the like. Furthermore, the track plan may be a method of adding the track plan of the moving apparatus that is a setting target of the track without changing the track plan of other moving apparatuses, or the entire optimization may be performed including the review of the track plan of the other moving apparatuses.

Moreover, the server 30 determines a passing point having the highest moving efficiency within a non-interference range with other moving apparatuses in a moving direction from the track starting point toward the destination, sets a track from the track starting point to the passing point having the highest moving efficiency, and updates the track starting point to the passing point having the highest moving efficiency, for the moving apparatus to which the track is to be set by assigning the moving task, and generates a track plan indicating the track to the destination. The server 30 transmits the generated track plan to the moving apparatus 20 so that the moving apparatus 20 can efficiently perform the moving task.

2. Configuration of Moving Apparatus and Server

Figure 2:
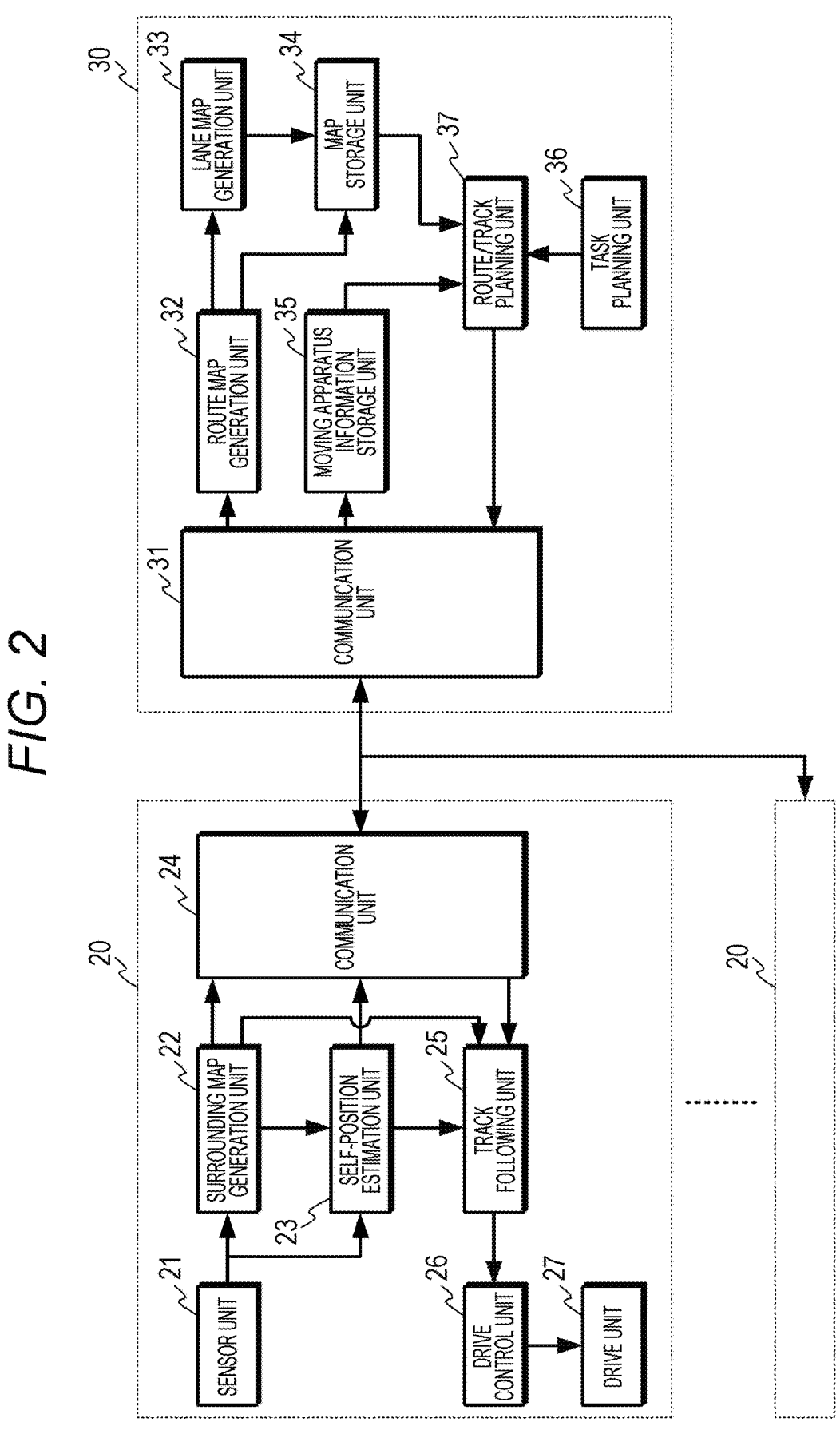
FIG. 2 is a diagram illustrating a configuration of a moving apparatus and a server.

Next, configurations of a moving apparatus (for example, a trackless automated guided vehicle) and a server will be described. FIG. 2 illustrates a configuration of a moving apparatus and a server.

The moving apparatus 20 includes a sensor unit 21, a surrounding map generation unit 22, a self-position estimation unit 23, a communication unit 24, a track following unit 25, a drive control unit 26, and a drive unit 27.

The sensor unit 21 includes an external sensor and an internal sensor. The external sensor of the sensor unit 21 acquires information regarding the surrounding environment of the moving apparatus (for example, information regarding surrounding objects and the like). As the external sensor, for example, a distance measuring sensor (light detection and ranging, laser imaging detection and ranging (LIDAR), time of flight (TOF)), stereo camera, and the like) is used. The external sensor generates sensing data (also referred to as "distance measurement data") indicating a distance to a surrounding object and outputs the sensing data to the surrounding map generation unit 22 and the self-position estimation unit 23. Furthermore, the internal sensor of the sensor unit 21 acquires information regarding the moving apparatus itself (for example, information indicating the position and posture of the moving apparatus, a change thereof, and the like). As the internal sensor, for example, a position sensor, an angle sensor, an acceleration sensor, a gyro sensor, or the like is used. The internal sensor outputs the generated sensing data (also referred to as "internal sensing data") to the self-position estimation unit 23.

The surrounding map generation unit 22 generates information indicating objects and the like located in the periphery on the basis of the distance measurement data generated by the sensor unit 21. The surrounding map generation unit 22 outputs the generated map information to the communication unit 24 and the track following unit 25.

The self-position estimation unit 23 estimates a self-position on the basis of the internal sensing data or the internal sensing data generated by the sensor unit 21 and the distance measurement data generated by the external sensor, and outputs self-position information indicating the estimated self-position to the communication unit 24 and the track following unit 25.

The communication unit 24 is connected to a network and performs wireless communication with the server 30. The wireless communication may include, for example, cellular communication using any of LTE, WCDMA (registered trademark), 5G, and the like, and may include near field communication using any of Wi-Fi, Bluetooth (registered trademark), and the like. The communication unit 24 performs wireless communication with the server 30, and transmits the map information generated by the surrounding map generation unit 22 and the self-position estimated by the self-position estimation unit 23 to the server 30. Note that the moving apparatus 20 may transmit moving apparatus information indicating its own size, performance, and the like from the communication unit 24 to the server 30. The communication unit 24 receives information transmitted from the server 30, for example, a track plan, and outputs the information to the track following unit 25.

The track following unit 25 performs movement control of the moving apparatus 20 using the map information generated by the surrounding map generation unit 22 and the estimation result of the self-position estimation unit 23 so as to move on the track indicated by the track plan supplied from the server 30. As will be described later, in the track plan, waypoints to the destination are sequentially indicated on the basis of the lane map indicating the lanes and the moving task assigned to the moving apparatus, and the track following unit 25 decides an optimum moving speed, angular velocity, and the like at that time on the basis of recognition of the surrounding environment of the moving apparatus 20 and the position of the next waypoint, generates a control signal so that the moving apparatus can move from the current location to the next waypoint while avoiding static or dynamic obstacles, and outputs the control signal to the drive control unit 26.

On the basis of the control signal generated by the track following unit 25, the drive control unit 26 generates a drive signal so that the moving apparatus 20 moves on the track indicated by the track plan, and outputs the drive signal to the drive unit 27.

The drive unit 27 includes wheels, a drive source (for example, a motor), and the like, and drives the wheels with the drive source on the basis of a drive signal from the drive control unit 26 to move the moving apparatus 20.

The server 30 includes a communication unit 31, a route map generation unit 32, a lane map generation unit 33, a map storage unit 34, a moving apparatus information storage unit 35, a task planning unit 36, and a route/track planning unit 37.

The communication unit 31 is configured to be able to perform wireless communication with the communication unit 24 of the moving apparatus 20. The wireless communication may include cellular communication as described above, or may include near field communication. The communication unit 31 performs wireless communication with the moving apparatus 20, and receives map information generated by the moving apparatus 20, estimated self-position information, and moving apparatus information. The communication unit 31 outputs the received map information and self-position information to the route map generation unit 32, and outputs the self-position information and the moving apparatus information to the moving apparatus information storage unit 35. Furthermore, the communication unit 31 transmits the track plan generated by the route/track planning unit 37 to the moving apparatus 20.

The route map generation unit 32 integrates the map information generated by each of the moving apparatuses 20 on the basis of the self-position information, and generates a movable region map indicating a region where the moving apparatus 20 can pass in the entire environment. Note that the route map generation unit 32 may generate the movable region map on the basis of sensing data acquired by an external sensor provided separately from the moving apparatus, or may acquire the movable region map generated in advance from an external device or the like. Furthermore, the route map generation unit 32 generates a route map having number-of-lanes information related to passages and passage widths on the basis of the movable region map. Note that the route map generation unit 32 updates the route map according to the change in the movable region. For example, the route map generation unit 32 automatically updates the movable region map when determining that the movable region through which the moving apparatus 20 can pass has changed due to installation, movement, removal, or the like of an obstacle, and automatically updates the route map in response to the update of the movable region map.

The lane map generation unit 33 generates a lane map indicating lanes on which the moving apparatus 20 passes on the basis of the route map having the number-of-lanes information generated by the route map generation unit 32. Note that details of generation of the route map and the lane map will be described later.

The map storage unit 34 stores the route map generated by the route map generation unit 32 and the lane map generated by the lane map generation unit 33.

The moving apparatus information storage unit 35 stores moving apparatus information and self-position information for each moving apparatus. Note that the moving apparatus information may be acquired by communication with the moving apparatus 20 as described above, or the user may input the moving apparatus information in advance.

The task planning unit 36 accepts a moving task request made by a user or the like, and decides a moving apparatus that performs the moving task. Moreover, the task planning unit 36 outputs task assignment information indicating the moving apparatus and the moving task assigned to the moving apparatus to the route/track planning unit 37.

The route/track planning unit 37 generates a route plan for performing the assigned moving task for each moving apparatus. In the generation of the route plan, the route to the destination is decided on the basis of the passages and the number-of-lanes information indicated by the route map generated by the route map generation unit 32. Moreover, the route/track planning unit 37 generates a track plan indicating the track of the moving apparatus in the decided route to the destination, for example, a list sequentially indicating waypoints passing on the lane. Furthermore, the route/track planning unit 37 sets a route and a track so that the moving efficiency of the entire system increases in a case where a moving task is performed by a plurality of moving apparatuses. Moreover, in a case where the route map is updated or in a case where new task assignment information is supplied, the route/track planning unit 37 performs processing of updating the route plan or the track plan. For example, in a case where the number-of-lanes information of the movement route is updated, in a case where the movement route of a moving apparatus that performs a newly received moving task overlaps, or the like, the route/track planning unit 37 generates a new route plan or track plan in consideration of the updated number-of-lanes information, or routes, lanes, or the like of other moving apparatuses. The route/track planning unit 37 transmits the track plan generated for each moving apparatus to the corresponding moving apparatus 20 via the communication unit 31.

3. Operation of Server

The server sets a boundary line including a point group having an equal distance from obstacles between obstacles in the movable region limited by the obstacles, and decides the number of lanes for the boundary line according to the distance from the obstacles and the size of the moving apparatus moving between the obstacles. Furthermore, the server generates a route map having number-of-lanes information on the basis of the boundary lines and the number of lanes decided for the boundary lines. Moreover, the server generates a lane map indicating lanes through which the moving apparatus can pass from the route map on the basis of the number-of-lanes information.

Furthermore, the server sets a node in the route of the moving apparatus, and limits the number of simultaneously existing moving apparatuses according to the number of lanes decided at the node or the edge. Moreover, the server selects a moving apparatus that executes the moving task, and generates a route plan indicating a route on which the selected moving apparatus moves. Moreover, the server generates a track plan sequentially indicating waypoints through which the moving apparatus that executes the moving task, that is, the moving apparatus that is the setting target of the track passes on the basis of the route plan and the lane map. Note that, in a case where the route map is updated, the server generates a route plan and a track plan again on the basis of the updated route map and the current location of each moving apparatus. The server transmits the generated track plan to the moving apparatus. The moving apparatus performs movement control of the moving apparatus so as to move on the track indicated by the track plan generated by the server, and executes the moving task.

<3-1. Operation for Generating Lane Map>

Figure 3:
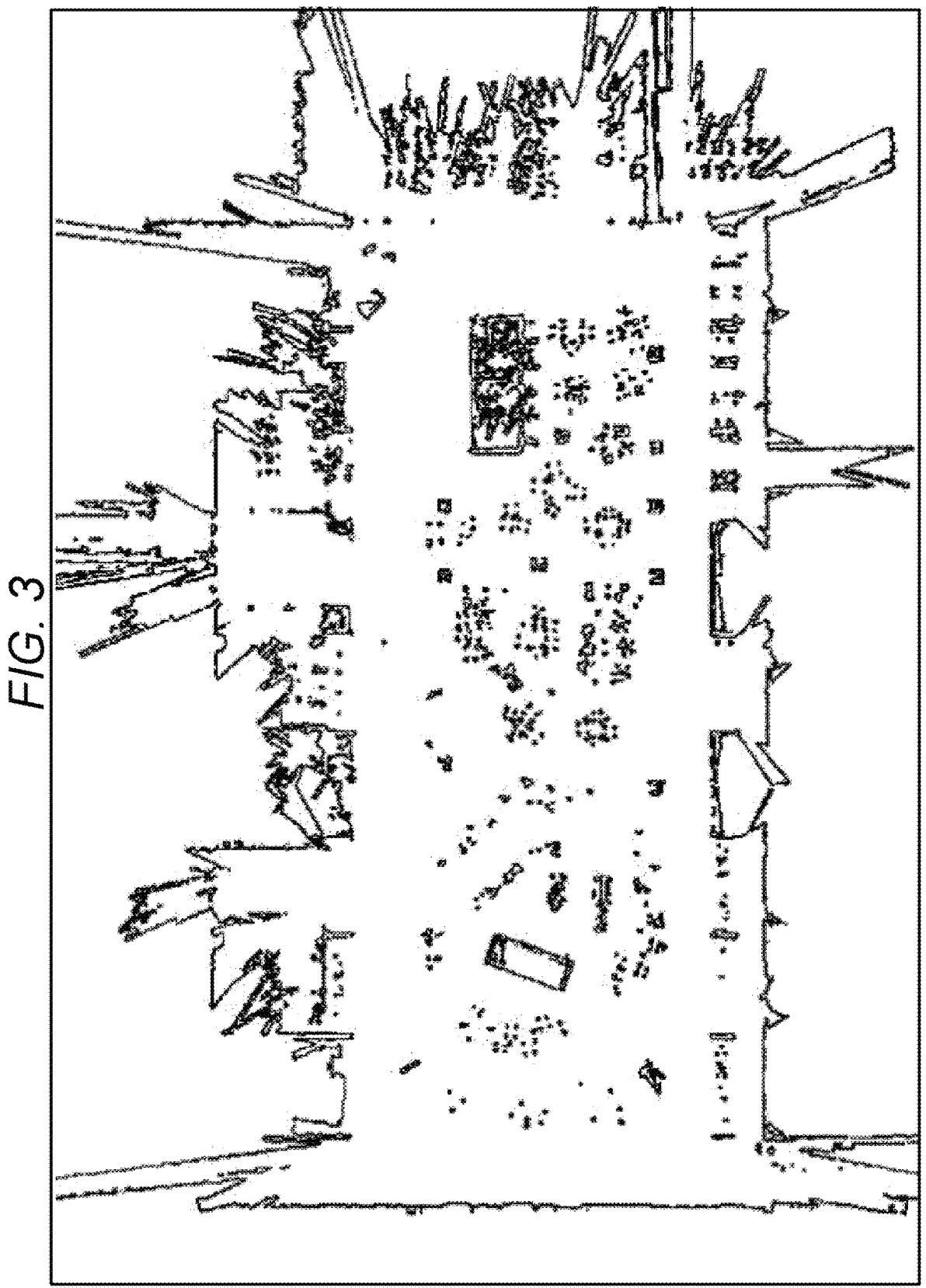
FIG. 3 is a diagram illustrating a movable region map.

Next, the operation for generating a lane map will be described. The route map generation unit 32 integrates, for example, map information generated by each moving apparatus to generate a movable region map indicating a region through which the moving apparatus can pass in the entire environment. Note that FIG. 3 illustrates a movable region map, and detected obstacles are indicated by lines (or dots).

Figure 4:
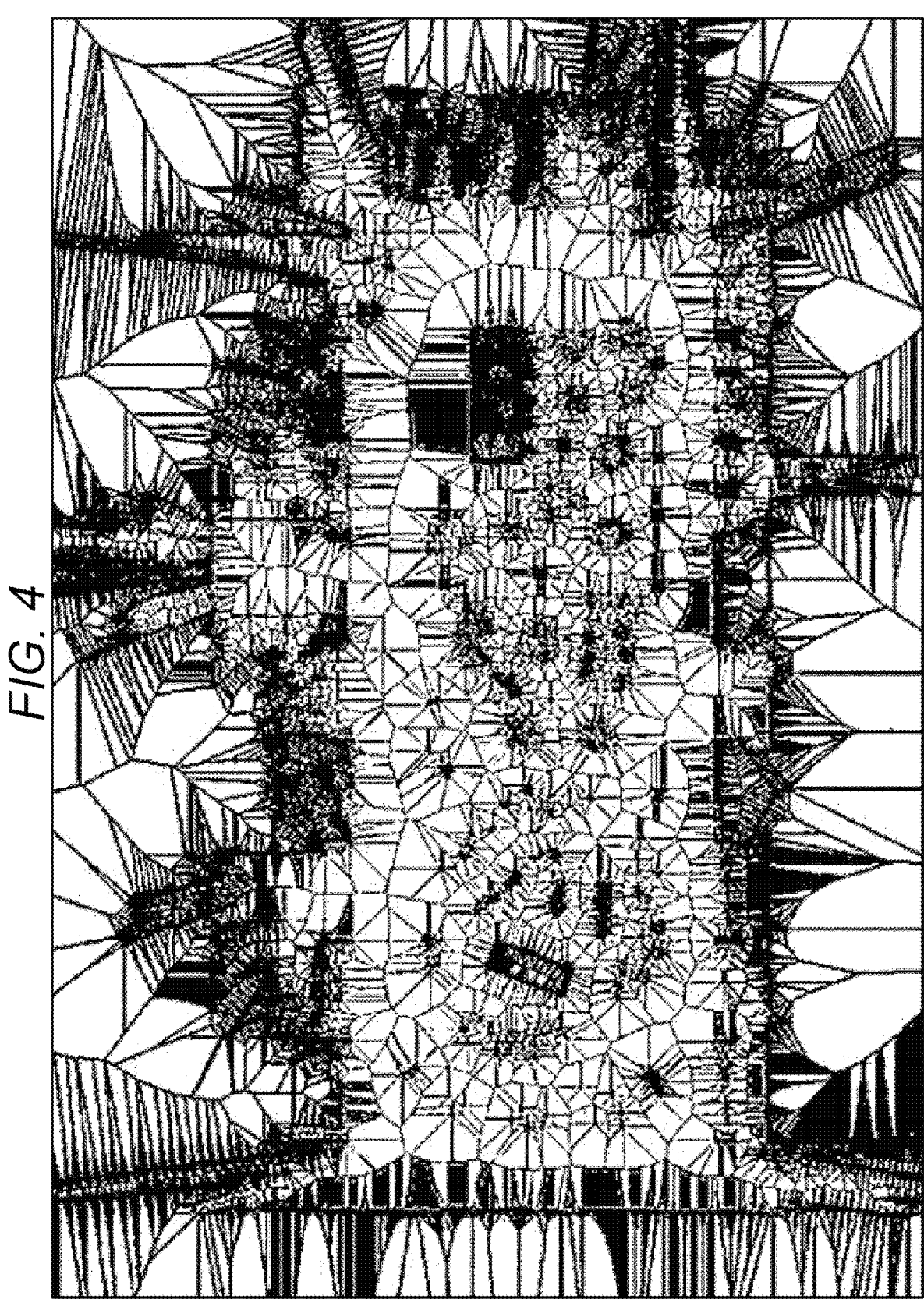
FIG. 4 is a diagram illustrating a division result of Voronoi region division.

The route map generation unit 32 extracts a boundary line indicating a skeleton of the movable region from the movable region map. The boundary line indicating the skeleton is extracted using, for example, a Voronoi region division method. Voronoi region division in two dimensions is a method of dividing a plane into regions by "which is the closest point" when a plurality of points is arranged in advance on the plane. The route map generation unit 32 performs Voronoi region division on the entire movable region, and extracts a boundary line, which is a point group having a feature that distances to two different obstacles are the same, as a boundary line indicating a skeleton. Note that FIG. 4 illustrates a division result of Voronoi region division, and illustrates a case where processing is performed using the movable region map illustrated in FIG. 3. Moreover, the route map generation unit 32 generates number-of-lanes information indicating the number of lanes of the moving apparatus for the extracted boundary line. For example, in a case where the distance W to the obstacle is smaller than ½ times the size (referred to as "size R") of the moving apparatus at each point on the boundary line indicating the skeleton, the moving apparatus cannot pass, and thus the route map generation unit 32 deletes the boundary line through which the moving apparatus cannot pass. Note that the size of the moving apparatus is the maximum value of the width of the moving apparatus orthogonal to the moving direction. Furthermore, in a case where the moving apparatus is a trackless automatic guided vehicle (AGV) or the like, the width of the moving apparatus is set to a size including the article to be conveyed. Furthermore, the size of the moving apparatus may include a margin.

Figure 5:
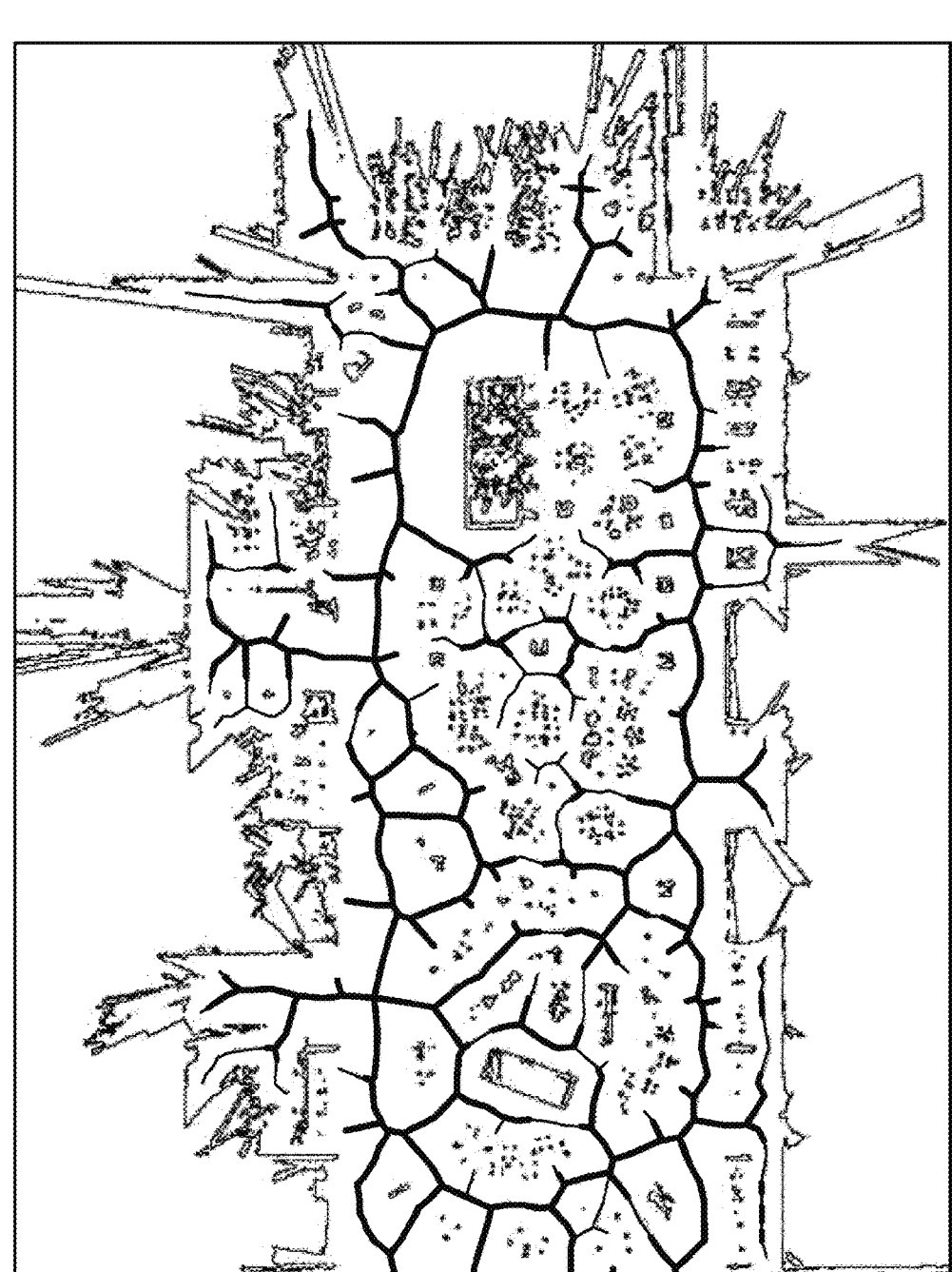
FIG. 5 is a diagram illustrating a boundary line to which number-of-lanes information is assigned.

In a case where the boundary lines are separated, the route map generation unit 32 leaves only the boundary line having the longest total distance and deletes the other boundary lines. Moreover, the route map generation unit 32 generates the number-of-lanes information for the remaining boundary line. For example, in a case where the distance W from the boundary line to the obstacle is equal to or more than N times the size R and less than (N+1) times the size R, the route map generation unit 32 sets the number-of-lanes information of the boundary line as the number of lanes N, and assigns the number-of-lanes information to the boundary line. FIG. 5 illustrates a boundary line to which the number-of-lanes information is assigned, and illustrates a case where the division result of Voronoi region division illustrated in FIG. 4 is used. In FIG. 5, boundary lines indicating passages through which the moving apparatus cannot pass are deleted, and in a case where the remaining boundary lines are separated, only the boundary line having the longest total distance is left and the other boundary lines are deleted. Note that, in FIG. 5, a boundary line having the number of lanes of "2" is indicated by a thick line, and a boundary line having the number of lanes of "1" is indicated by a thin line.

Figure 6:
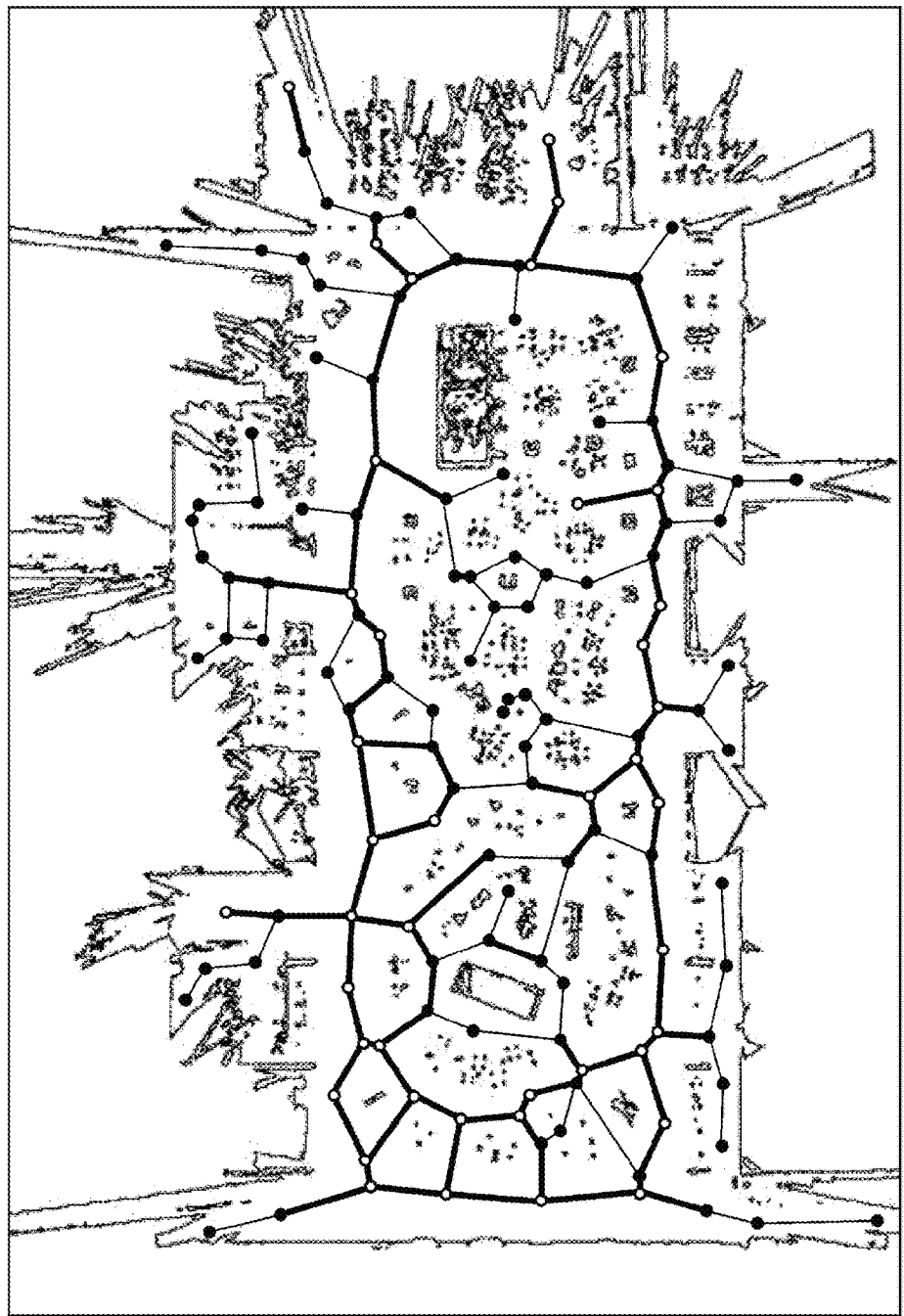
FIG. 6 is a diagram illustrating a route map including number-of-lanes information.

The route map generation unit 32 assigns nodes to the boundary line to which the number-of-lanes information is assigned, and connects the nodes by edges to generate a route map. Note that, in the generation of the route map, the route map may be generated by optimizing the arrangement of the nodes by deleting, adding, or moving the nodes such that the distance between the nodes or the separation distance between the edge between the nodes and the boundary line falls within a predetermined range. Moreover, the route map generation unit 32 further includes number-of-lanes information in the generated route map. Note that FIG. 6 illustrates a route map having the number-of-lanes information, and is generated on the basis of the boundary line to which the number-of-lanes information illustrated in FIG. 5 is assigned.

The route map generation unit 32 generates a lane map on the basis of the route map including the number-of-lanes information. The route map generation unit 32 generates a lane map in which the number of lanes of the nodes and the edges are 1 by providing edges equal in number to the number of lanes and setting nodes at both ends. For example, the route map generation unit 32 provides new N waypoints in the vicinity of both end nodes of the edge of the number of lanes N, connects the waypoints by the edges, and sets the number of lanes to "1". Furthermore, a lane map is generated by connecting waypoints in a mesh shape with edges and setting the number of lanes to "1".

Figure 7:
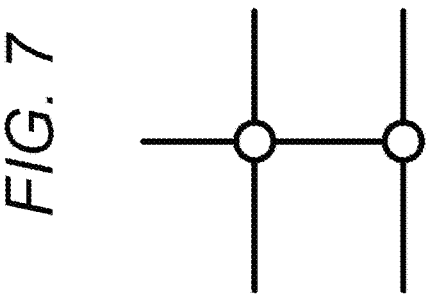
FIG. 7 is a diagram for explaining generation of a lane map.
Figure 7:
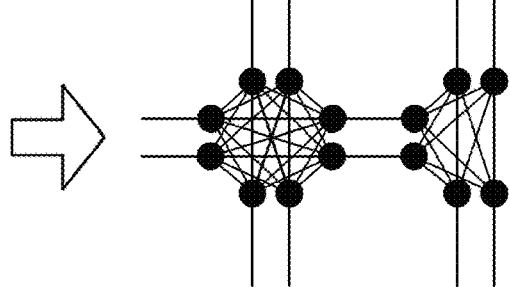
Figure 7:
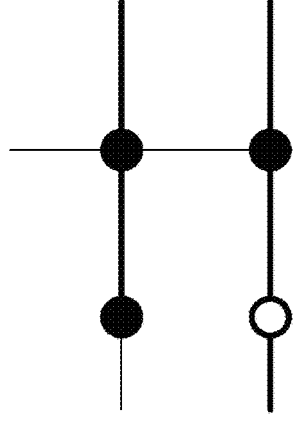
Figure 7:
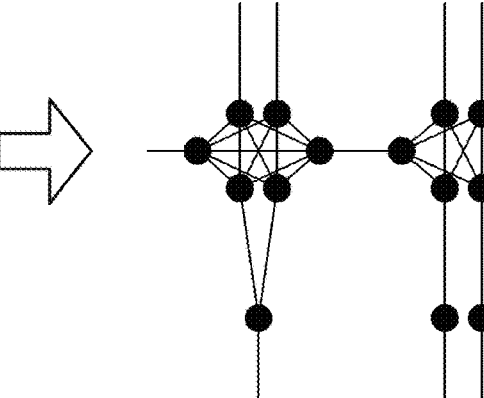
Figure 8:
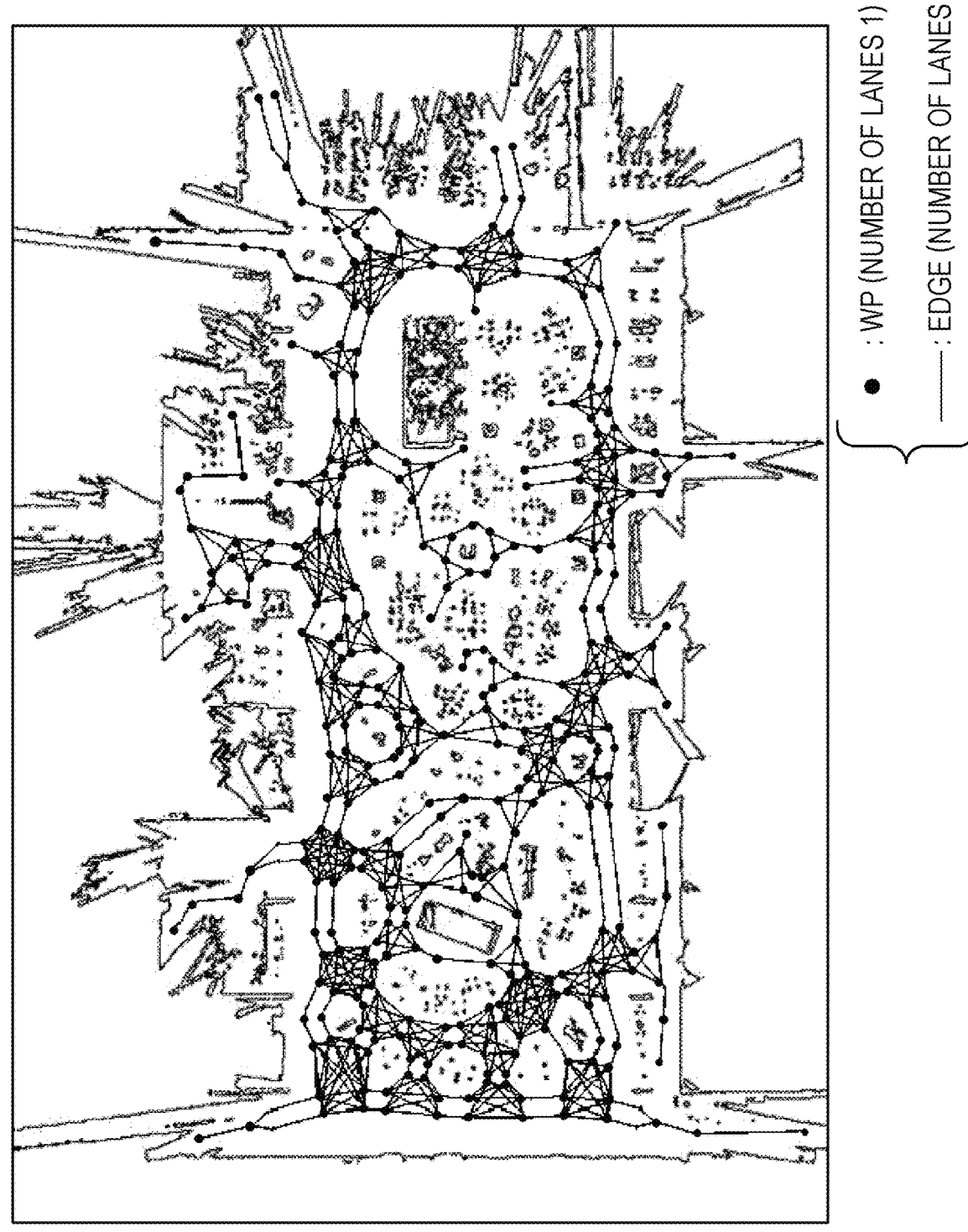
FIG. 8 is a diagram illustrating a lane map generated using the route map illustrated in FIG. 6.

FIG. 7 is a diagram for explaining generation of a lane map, in which (a) of FIG. 7 illustrates a topological map in which number-of-lanes information is assigned to nodes and edges, and (b) of FIG. 7 illustrates a lane map corresponding to the topological map. When the above-described processing is performed on the topological map in which the number-of-lanes information is assigned to the nodes and the edges, a lane map in which the number of lanes of the waypoints and the edges is "1" can be generated. FIG. 8 illustrates a lane map generated using the route map illustrated in FIG. 6. In the number-of-lanes information of the route map, one edge is provided for a passage whose number of lanes is "1", and two edges are provided for a passage whose number of lanes is "2".

<3-2. Operation for Generating Track Plan>

Next, an operation for generating a track plan will be described. The route/track planning unit 37 uses the route map generated by the route map generation unit 32 to generate a route plan indicating a route from the current position to a node at a destination position so as not to exceed the number of lanes indicated by the number-of-lanes information. Moreover, the route/track planning unit 37 generates a track plan indicating lanes to be used as waypoints when the moving apparatus moves along the route indicated by the route plan on the basis of the generated route plan and lane map. In the track plan, a track from a current position to a destination is indicated by waypoints, and the moving apparatus can move to the destination by sequentially following the waypoints indicated in the track plan. Moreover, the route/track planning unit 37 specifies a range (referred to as a "non-interference range") in which deadlock, collision, or the like with other moving apparatuses occurs in the moving direction from the track starting point (for example, the current location of the moving apparatus) toward the target point, and determines the passing point having the highest moving efficiency in the non-interference range. Furthermore, setting of a track from the track starting point to the passing point having the highest moving efficiency and updating of the track starting point to the passing point having the highest moving efficiency are performed, and this processing is repeated to generate a track plan indicating a track to a destination. As described above, the route/track planning unit 37 generates a track plan optimized so that the moving task can be efficiently executed in consideration of the movement of other moving apparatuses.

Figure 9:
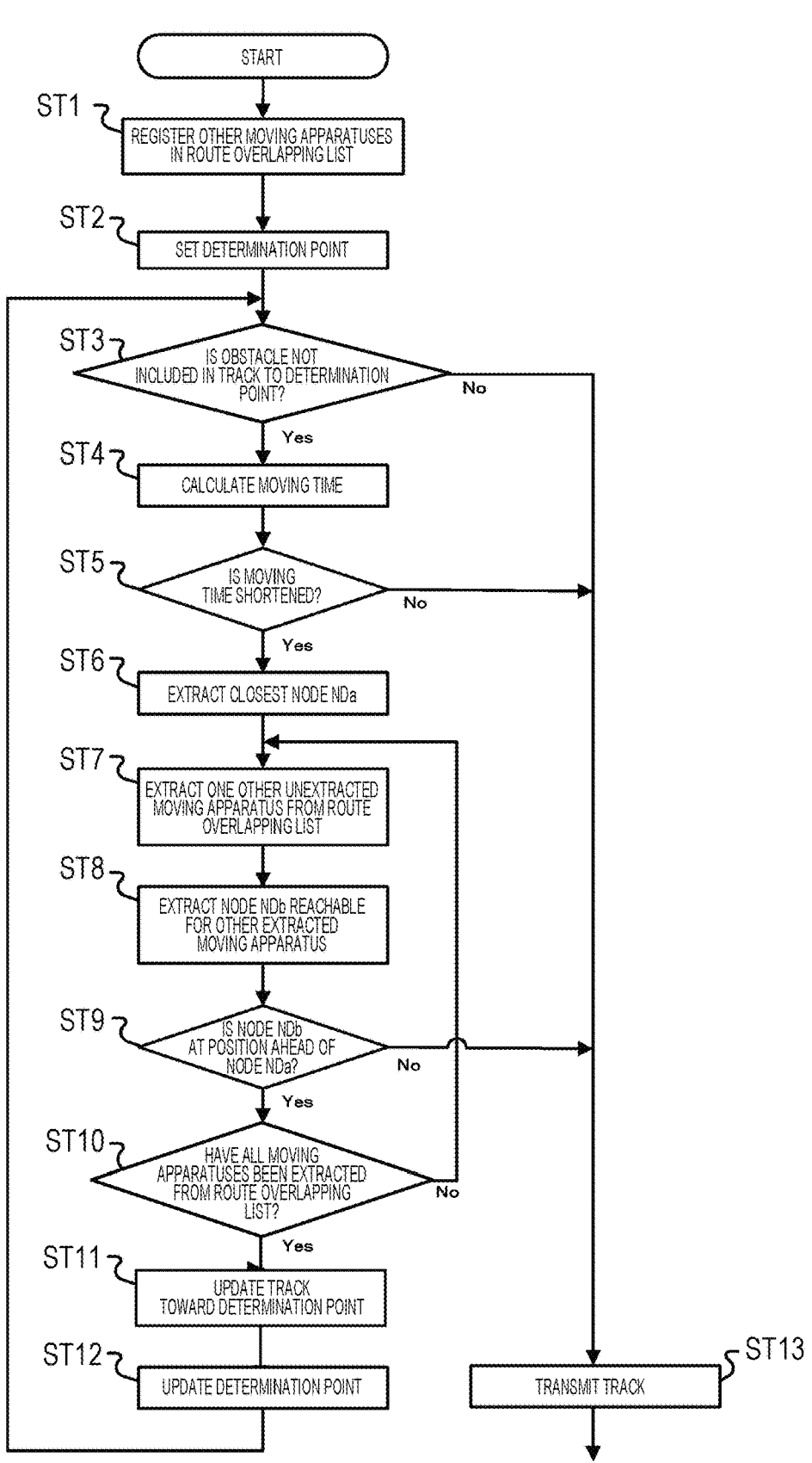
FIG. 9 is a flowchart illustrating an operation for generating a track plan.

FIG. 9 is a flowchart illustrating an operation for generating a track plan, and illustrates a case where lane change is not performed. The route/track planning unit 37 thins out waypoints in the middle from the track starting point, determines a waypoint having the shortest moving time from the track starting point without causing deadlock, collision, or the like with an obstacle or other moving apparatuses as a waypoint having the highest moving efficiency, and sets a track from the track starting point to the waypoint having the highest moving efficiency.

In step ST1, the route/track planning unit registers other moving apparatuses in the route overlapping list. The route/track planning unit 37 registers, on the basis of the route plan already generated for the moving apparatus (also referred to as "track setting moving apparatus") that executes the moving task on the basis of the generated track plan and other moving apparatuses, other moving apparatuses whose routes overlap with the track setting moving apparatus in the route overlapping list, and proceeds to step ST2.

In step ST2, the route/track planning unit sets a determination point. The route/track planning unit 37 thins out the waypoint next to the waypoint (hereinafter referred to as "track starting point") as the starting point of the track, sets the post-thinning waypoint as a determination point (determination passing point), and proceeds to step ST3.

In step ST3, the route/track planning unit determines whether or not an obstacle is included in the track to the determination point. The route/track planning unit 37 proceeds to step ST4 in a case where no obstacle is included in the track connecting the track starting point and the determination point, and proceeds to step ST13 in a case where an obstacle is included.

In step ST4, the route/track planning unit calculates a moving time. The route/track planning unit 37 calculates a moving time (also referred to as "post-thinning moving time") in a case where the track setting moving apparatus moves on a track connecting the track starting point and the determination point with a straight line and a moving time (also referred to as "pre-thinning moving time") in a case where the track setting moving apparatus moves on a track connecting the track starting point to the determination point without thinning the waypoint, and proceeds to step ST5.

In step ST5, the route/track planning unit determines whether the moving time is shortened. In a case where the post-thinning moving time is shorter than the pre-thinning moving time, the route/track planning unit 37 determines that the moving time is shortened and proceeds to step ST6. In a case where the post-thinning moving time is not shorter than the pre-thinning moving time, the route/track planning unit determines that the moving time is not shortened and proceeds to step ST13.

In step ST6, the route/track planning unit extracts the closest node NDa. The route/track planning unit 37 extracts the closest node NDa closest to the determination point in the traveling direction, and proceeds to step ST7.

In step ST7, the route/track planning unit extracts one other unextracted moving apparatus from the route overlapping list. The route/track planning unit 37 extracts one other moving apparatus from the route overlapping list in which the other moving apparatuses are registered in step ST1, and proceeds to step ST8.

In step ST8, the route/track planning unit extracts a node NDb reachable for the other extracted moving apparatus. The route/track planning unit 37 extracts the closest node NDb closest to the other moving apparatus in the traveling direction when the post-thinning moving time calculated in step ST4 has elapsed, on the basis of the route plan and moving apparatus information of the other extracted moving apparatus, and proceeds to step ST9.

In step ST9, the route/track planning unit determines whether the node NDb is at a position ahead of the node NDa. The route/track planning unit 37 specifies the non-interference range on the basis of the positions of other moving apparatuses when the track setting moving apparatus moves from the track starting point to the determination point of the moving efficiency. Specifically, the route/track planning unit 37 specifies the non-interference range on the basis of the closest node located in the traveling direction with respect to the determination point and the closest node located in the traveling direction with respect to the other moving apparatus, and in a case where the node NDb is at a position ahead of the node NDa on the route in the traveling direction of the track setting moving apparatus, the determination point corresponding to the node NDa is a waypoint within the non-interference range. In a case where the other moving apparatus has not reached the position of the track setting moving apparatus, that is, in a case where the determination point is within the non-interference range, the route/track planning unit 37 proceeds to step ST10. Furthermore, in a case where the node NDb is at a position before the node NDa in the traveling direction of the track setting moving apparatus, that is, in a case where the determination point is not in the non-interference range, the route/track planning unit 37 proceeds to step ST13.

In step ST10, the route/track planning unit determines whether all the moving apparatuses have been extracted from the route overlapping list. The route/track planning unit 37 proceeds to step ST11 in a case where all the moving apparatuses in the route overlapping list have been extracted, and returns to step ST7 in a case where there are other moving apparatuses that have not been extracted.

In step ST11, the route/track planning unit updates the track toward the determination point. The route/track planning unit 37 updates the track before thinning to a track from the track starting point to the determination point, and proceeds to step ST12.

In step ST12, the route/track planning unit updates the determination point. The route/track planning unit 37 updates the current determination point to the next waypoint and returns to step ST3.

In step ST13, the route/track planning unit transmits the track. The route/track planning unit 37 transmits the track set by the processing from step ST2 to step ST12 to the moving apparatus.

As described above, in a case where a determination point having high moving efficiency is detected by the processing of steps ST1 to ST12, and it is determined that the waypoint one ahead is set as the determination point and the moving efficiency decreases, the waypoint one before is the waypoint having the highest moving efficiency, and the track from the track starting point to the waypoint having the highest moving efficiency is transmitted to the moving apparatus 20.

Note that FIG. 9 illustrates a case where the track plan indicating the set track is transmitted to the moving apparatus every time the track from the track starting point to the waypoint having the highest moving efficiency is set. Therefore, the server 30 can sequentially set the optimum track to the destination by updating the track starting point to the waypoint having the highest moving efficiency and repeating the processing from step ST2 to step ST13 until the determination point becomes the destination, for example. Furthermore, the server 30 may generate a track plan indicating an optimal track to the destination and transmit the track plan to the moving apparatus 20. Furthermore, the waypoint having the highest moving efficiency is not limited to a point at which the moving time from the track starting point is the shortest without causing deadlock, collision, or the like with an obstacle or other moving apparatuses, and may be determined in consideration of the performance of the moving apparatus. For example, in a case where it takes time to change the orientation of the moving apparatus, the track may be set so that the change in the orientation is reduced.

Furthermore, the waypoint having the highest moving efficiency may be determined on the basis of the cost value. For example, when the moving distance is long, the parameter is set such that the cost value increases. Furthermore, on the basis of the performance of the moving apparatus, in a case where it takes time to change the orientation, the parameter is set such that the cost value increases. Furthermore, as the moving environment, for example, in a case where the inclination of the traveling surface is large, the parameter is installed so that the cost value increases. The server 30 may determine the waypoint at which the sum of the cost values of the parameters is minimum as the waypoint with the highest moving efficiency.

Figure 10:
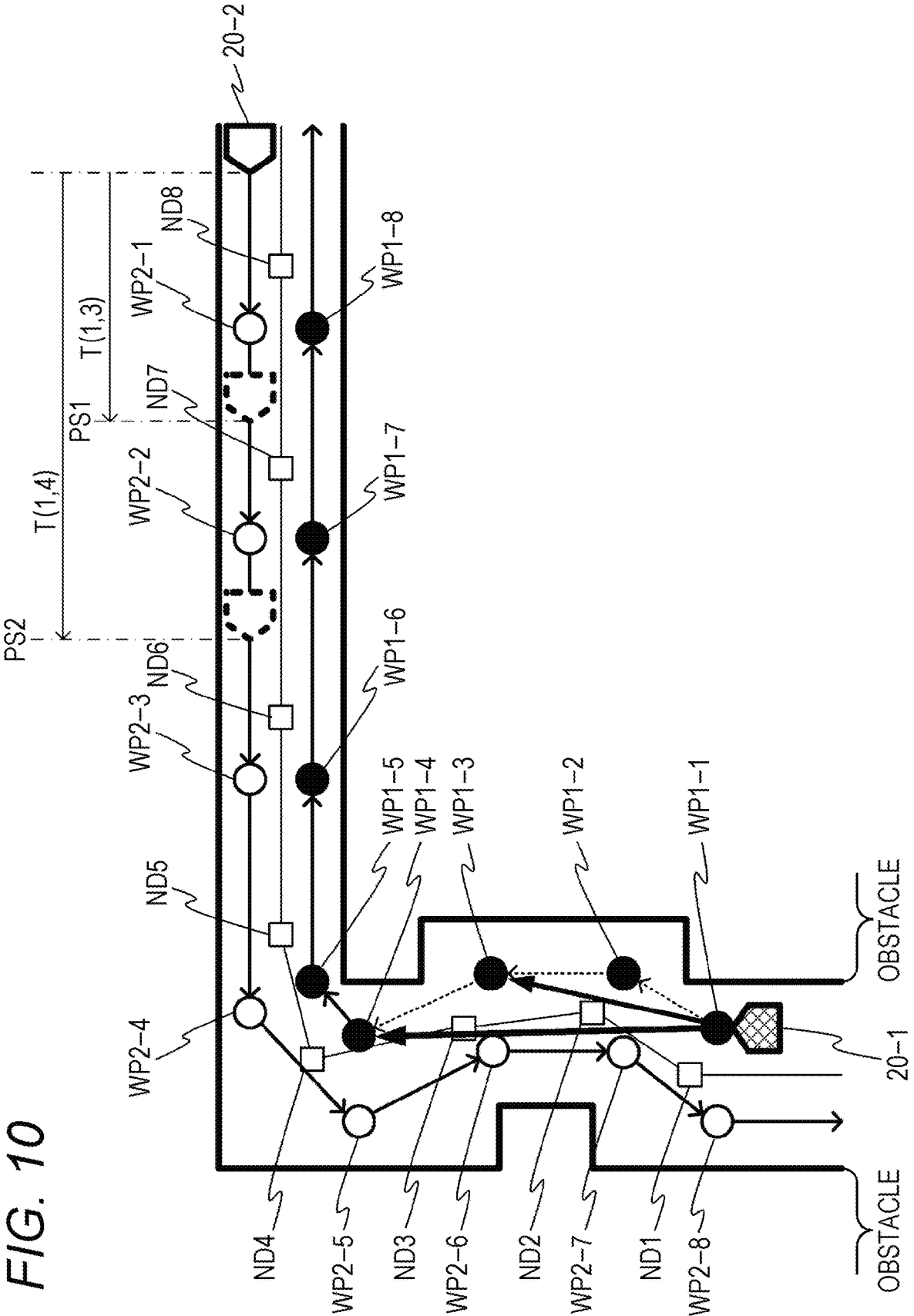
FIG. 10 is a diagram illustrating a specific example of track planning in a case where lane change is not performed.

FIG. 10 illustrates a specific example of the track plan in a case where lane change is not performed. The route map generated by the server 30 indicates the nodes ND1 to ND8, and the lane map indicates the lane provided with the waypoint WP1-$n$ and the lane provided with the waypoint WP2-$n$. The track setting moving apparatus 20-1 moves in the lane provided with the waypoint WP1-$n$, and the other moving apparatus 20-2 moves in the lane provided with the waypoint WP2-$n$.

The server 30 sets the waypoint WP1-1 located in the moving direction of the track setting moving apparatus 20-1 as a track starting point, thins out a waypoint next to the track starting point, and sets the post-thinning waypoint WP1-3 as a determination point.

Since there is no obstacle in the track connecting the waypoint WP1-1 and the waypoint WP1-3, the server 30 calculates the moving time $T(1, 3)$ required for the track setting moving apparatus 20-1 to move from the waypoint WP1-1 to the waypoint WP1-3. In a case where the calculated moving time $T(1, 3)$ is shorter than the moving time $T(1, 2, 3)$ required for moving from the waypoint WP1-1 to the waypoint WP1-3 via the waypoint WP1-2, the server 30 extracts the node ND3 (=NDa) closest to the determination point WP1-3 in the traveling direction.

Next, for the other moving apparatus 20-2 included in the route overlapping list, the server 30 extracts the node ND7 (=NDb) closest in the traveling direction from the position when the calculated moving time $T(1, 3)$ has elapsed. The node ND7 is at a position ahead of the node ND3 in the moving direction of the track setting moving apparatus 20-1, and the determination point WP1-3 is a waypoint within a non-interference range with the other moving apparatus in the moving direction toward the destination. When moving from the waypoint WP1-1 to the waypoint WP1-3, the track setting moving apparatus 20-1 does not cause a deadlock, collision, or the like with the other moving apparatus 20-2, and thus the next waypoint of the waypoint WP1-1 is set as the waypoint WP1-3.

Next, the server 30 sets the waypoint WP1-4 next to the waypoint WP1-3 as a determination point. Since there is no obstacle in the track connecting the waypoint WP1-1 and the waypoint WP1-4, the server 30 calculates the moving time T (1, 4) required for the track setting moving apparatus 20-1 to move from the waypoint WP1-1 to the waypoint WP1-4. In a case where the calculated moving time T (1, 4) is shorter than the moving time T (1, 3, 4) required for moving from the waypoint WP1-1 to the waypoint WP1-4 via the way-point WP1-3, the server 30 extracts the node ND4 (=NDa) closest to the determination point WP1-4 in the traveling direction.

Furthermore, for the other moving apparatus 20-2 included in the route overlapping list, the server 30 extracts the node ND6 (=NDb) closest in the traveling direction from the position when the calculated moving time T (1, 4) has elapsed. Note that the position when the moving time T (1, 4) has elapsed is a position when the other moving apparatus 20-2 moves at the maximum speed and the moving time T (1, 4) has elapsed. Furthermore, in a case where the speed at which the other moving apparatus 20-2 moves on the track is set, the position at which the moving time T (1, 4) has elapsed may be the position at which the moving apparatus moves at the set speed and the moving time T (1, 4) has elapsed. The node ND6 is a position ahead of the node ND4 in the moving direction of the track setting moving appa-ratus 20-1. That is, when the track setting moving apparatus 20-1 moves from the waypoint WP1-1 to the waypoint WP1-4, since no deadlock, collision, or the like with the other moving apparatus 20-2 occurs, the next waypoint of the waypoint WP1-1 is set as the waypoint WP1-4.

Next, the server 30 sets the waypoint WP1-5 next to the waypoint WP1-4 as a determination point. Since an obstacle is included in the track connecting the waypoint WP1-1 and the waypoint WP1-5, the server 30 determines the waypoint WP1-4 as the waypoint having the highest moving efficiency in the non-interference range, and transmits the track from the waypoint WP1-1 as the track starting point to the waypoint WP1-4 having the highest moving efficiency to the track setting moving apparatus 20-1.

Note that, even though not illustrated, in a case where the other moving apparatus 20-2 is approaching the track setting moving apparatus 20-1 and, for example, the node NDa=ND4 and the node NDb=ND3 are satisfied, the way-point WP1-4 is out of the non-interference range, and when the track setting moving apparatus 20-1 moves from the waypoint WP1-1 to the waypoint WP1-4, it passes the other moving apparatuses 20-2. Furthermore, the track of the track setting moving apparatus 20-1 approaches the lane of the other moving apparatus 20-2 by thinning out the waypoints, and the track setting moving apparatus 20-1 may cause deadlock, collision, or the like with the other moving apparatus 20-2 at the time of passing each other. Therefore, the server 30 sets the track with the waypoint having the highest moving efficiency in the non-interference range as the waypoint WP1-3.

The server 30 updates the track starting point to the waypoint having the highest moving efficiency within the non-interference range, performs similar processing as described above, and sets the track to the destination.

As described above, the server 30 specifies the non-interference range for the own lane on which the track setting moving apparatus moves, determines the waypoint having the highest moving efficiency within the non-inter-ference range in the moving direction toward the destina-tion, sets the track from the track starting point to the passing point having the highest moving efficiency, and updates the track starting point to the passing point having the highest moving efficiency by the route/track planning unit 37, so that it is possible to generate the track plan that can efficiently operate the moving apparatus.

Furthermore, in a case where the movement or the track of the other moving apparatus 20-2 is changed, in a case where another moving apparatus is newly added, in a case where the position of the obstacle is moved, or the like, the server 30 generates the track plan again and transmits the track plan to the track setting moving apparatus 20-1, so that the moving apparatus can be efficiently operated corre-sponding to the change in the moving environment.

<3-2. Another Operation for Generating Track Plan>

Next, another operation for generating a track plan will be described. When generating a track plan indicating a track from the current position to the destination as waypoints, the route/track planning unit 37 makes waypoints of lanes through which other moving apparatuses pass available. Moreover, the route/track planning unit 37 generates a track plan so that the moving task can be efficiently executed in consideration of the movement of other moving apparatuses.

Figure 11:
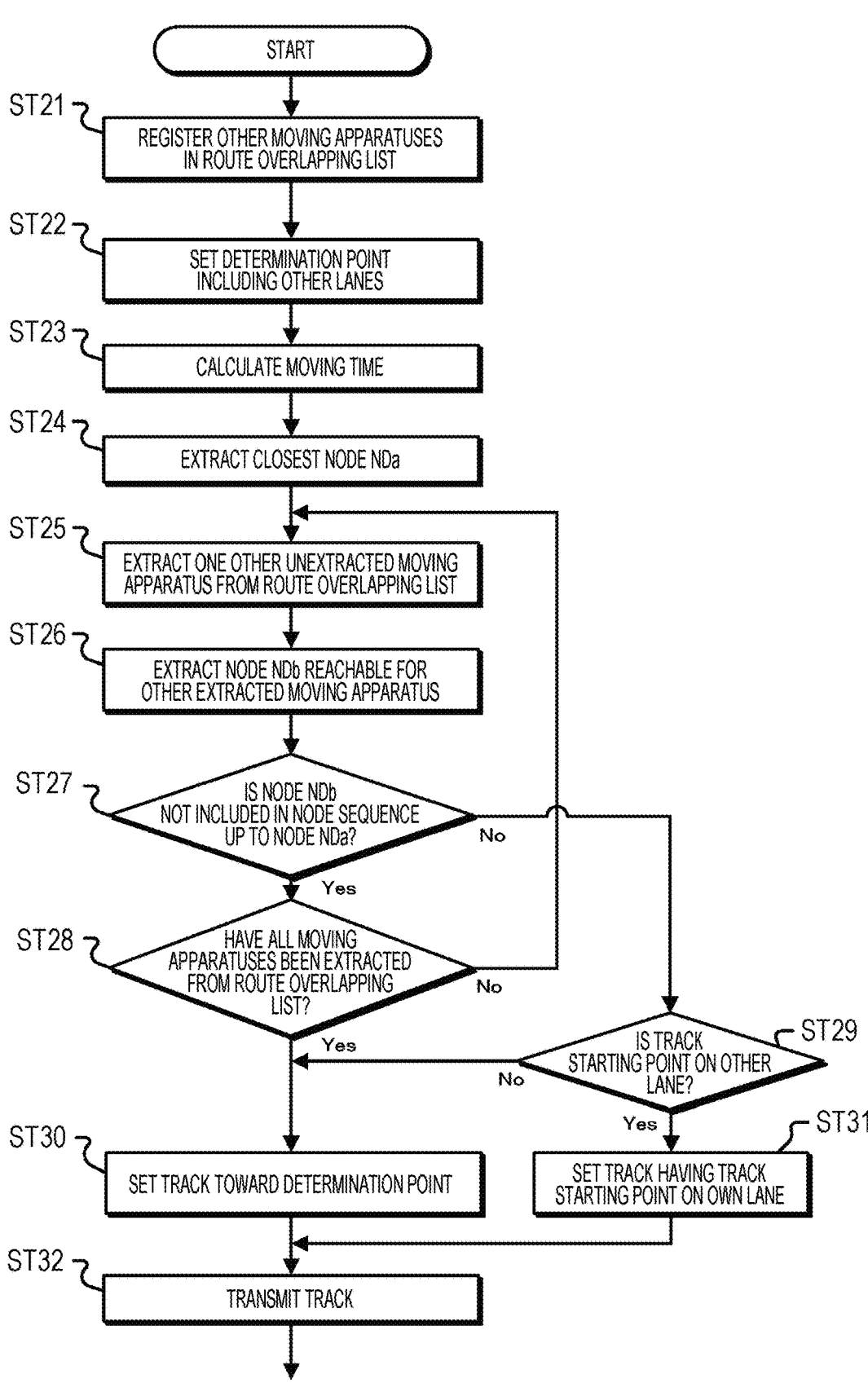
FIG. 11 is a flowchart illustrating another operation for generating a track plan.

FIG. 11 is a flowchart illustrating another operation for generating a track plan, and illustrates a case where lane change is performed. When the lane change is performed, the route/track planning unit 37 determines whether the moving time can be shortened without causing a deadlock, collision, or the like with other moving apparatuses, and generates an optimal track plan on the basis of the determi-nation result.

In step ST21, the route/track planning unit registers other moving apparatuses in the route overlapping list. The route/track planning unit 37 registers, on the basis of the route plan already generated for the track setting moving apparatus that executes the moving task on the basis of the generated track plan and other moving apparatuses, other moving appara-tuses whose routes overlap with the track setting moving apparatus in the route overlapping list, and proceeds to step ST22.

In step ST22, the route/track planning unit sets a deter-mination point including other lanes. For the track setting moving apparatus, the route/track planning unit 37 increases a cost value as a spatial distance from a track starting point to a next waypoint becomes longer, for example, as a cost, including a lane in a moving direction of the own apparatus (also referred to as the own lane) and a lane in a moving direction of other moving apparatuses (for example, referred to as a lane in which the moving direction is opposite or another lane). The route/track planning unit 37 calculates a waypoint having the minimum cost value using the Dijks-tra's algorithm or the like, sets the calculated waypoint as a determination point, and proceeds to step ST23.

In step ST23, the route/track planning unit calculates a moving time. The route/track planning unit 37 calculates the moving time by dividing the distance between the track starting point and the determination point set in step ST22 by the moving speed (for example, average moving speed) of the track setting moving apparatus, and proceeds to step ST24.

In step ST24, the route/track planning unit extracts the closest node NDa. The route/track planning unit 37 extracts the node NDa closest to the determination point in the traveling direction, and proceeds to step ST25.

In step ST25, the route/track planning unit extracts one other unextracted moving apparatus from the route overlapping list. The route/track planning unit 37 extracts one other moving apparatus that has not been extracted from the route overlapping list in which the other moving apparatuses have been registered in step ST21, and proceeds to step ST26.

In step ST26, the route/track planning unit extracts a node NDb reachable for the other extracted moving apparatus. The route/track planning unit 37 extracts the node NDb closest to the other moving apparatus in the traveling direction when the moving time calculated in step ST23 has elapsed on the basis of the route plan and moving apparatus information of the other extracted moving apparatus, and proceeds to step ST27.

In step ST27, the route/track planning unit determines whether the node NDb is not included in the node sequence up to the node NDa. The route/track planning unit 37 specifies the non-interference range on the basis of the positions of other moving apparatuses when the track setting moving apparatus moves from the track starting point to the determination point of the moving efficiency. Specifically, the route/track planning unit 37 sets the determination point corresponding to the node NDa as a waypoint within the non-interference range in a case where the node NDb is not included in the node sequence up to the node NDa. Furthermore, the route/track planning unit 37 sets the determination point corresponding to the node NDa as a waypoint that is not in the non-interference range in a case where the node NDb is included in the node sequence up to the node NDa. The route/track planning unit 37 proceeds to step ST28 in a case where the determination point is within the non-interference range, and proceeds to step ST29 in a case where the determination point is not within the non-interference range.

In step ST28, the route/track planning unit determines whether all the moving apparatuses have been extracted from the route overlapping list. The route/track planning unit 37 proceeds to step ST30 in a case where all the moving apparatuses in the route overlapping list have been extracted, and returns to step ST25 in a case where there is a moving apparatus that has not been extracted.

When the process proceeds from step ST27 to step ST29, the route/track planning unit determines whether the track starting point is on the other lane. The route/track planning unit 37 proceeds to step ST30 in a case where the track starting point is on the own lane, and proceeds to step ST31 in a case where the track starting point is on the other lane.

In step ST30, the route/track planning unit sets a track toward the determination point. The route/track planning unit 37 sets the track so as to go from the track starting point to the determination point set in step ST22, and proceeds to step ST32.

In step ST31, the route/track planning unit sets a track having a track starting point on the own lane. The route/track planning unit 37 generates a track for updating the track starting point from the waypoint on the other lane to the waypoint on the own lane, and proceeds to step ST32.

In step ST32, the route/track planning unit transmits the track. The route/track planning unit 37 transmits the track set by the processing from step ST22 to step ST31 to the moving apparatus. For example, the route/track planning unit 37 transmits, to the moving apparatus, a track having the minimum cost value in a case where there is no conflict with other moving apparatuses, and transmits, to the moving apparatus, a track having the minimum cost value while avoiding conflict in a case where there is a conflict with other moving apparatuses during movement.

Note that FIG. 11 illustrates the case where the track starting point is set as the waypoint of the own lane in a case where the track starting point is on the other lane and the determination point on the other lane is not in the non-interference range. However, the determination point may be changed to the waypoint of the own lane, and the processing from step ST23 may be performed.

Figure 12:
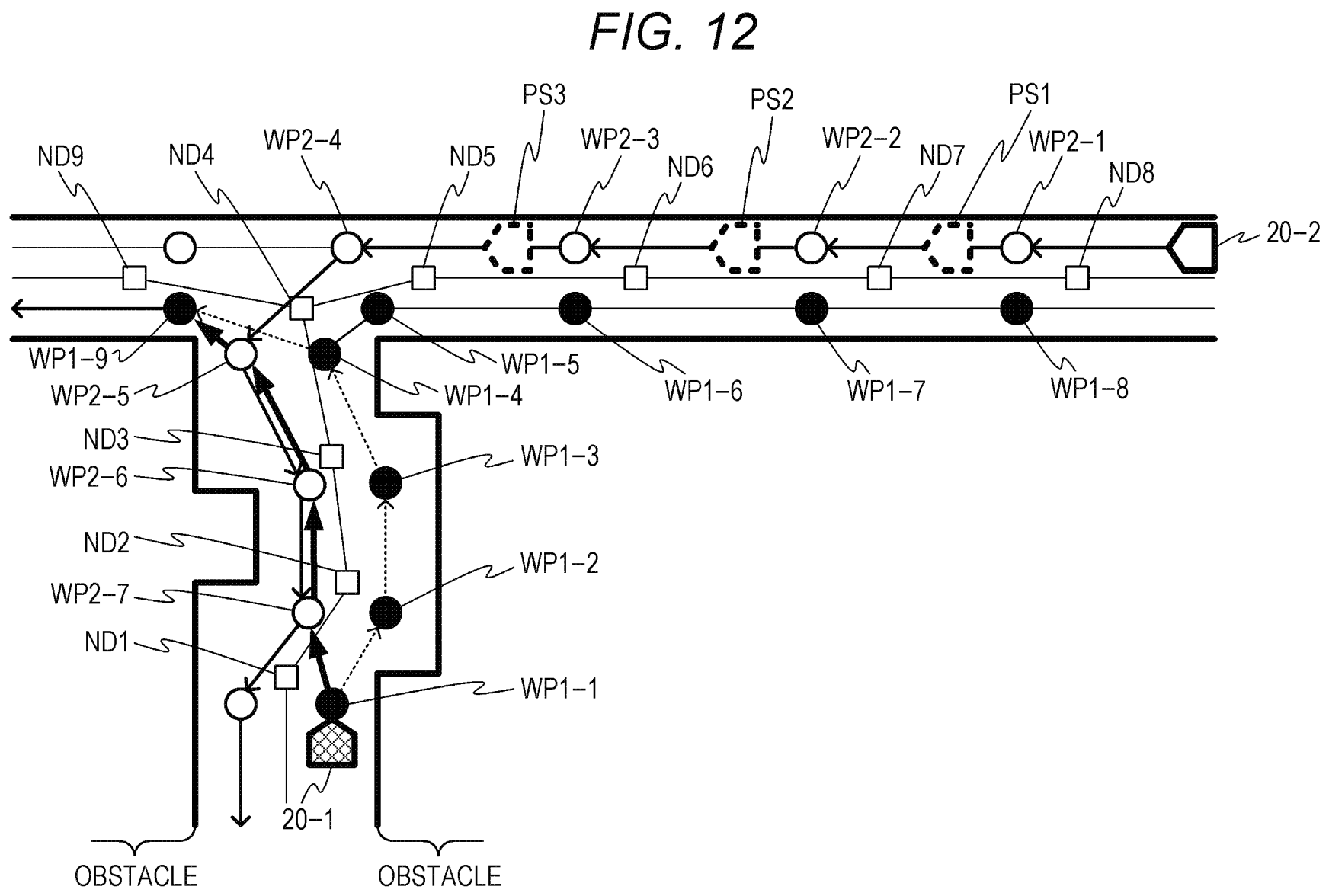

FIG. 12 illustrates a specific example of the track plan in a case where lane change is performed. The route map generated by the server 30 indicates the nodes ND1 to ND9, the lane map indicates the own lane provided with the waypoint WP1-$n$ and the other lane provided with the waypoint WP2-$n$, and the own lane and the other lane are set to be opposite in their moving directions. Furthermore, when the moving apparatus can shorten the moving distance and the moving time by using not only the own lane but also the other lane, the moving apparatus uses the other lane so as not to cause deadlock, collision, or the like with other moving apparatuses.

For example, the server 30 sets the waypoint WP2-7 at which the cost value to the next waypoint located in the moving direction of the track setting moving apparatus 20-1 is minimized as the determination point with the waypoint WP1-1 as the track starting point.

The server 30 calculates the moving time required for the track setting moving apparatus 20-1 to move from the track starting point to the determination point on the basis of the distance from the track starting point to the determination point and the moving speed (for example, average moving speed) of the track setting moving apparatus 20-1. Furthermore, the server 30 extracts the closest node to the determination point, that is, the node NDa (=ND2) closest in the traveling direction.

Next, the server 30 extracts the node NDb (=ND7) closest in the traveling direction to the position PS1 of the moving apparatus 20-2 when the moving time required for the track setting moving apparatus 20-1 to move from the track starting point to the determination point has elapsed.

Since the node NDb (=ND7) is not included in the node sequence from the node ND1 to the node NDa (=ND2) closest to the track starting point in the traveling direction, the server 30 sets the track such that the determination point WP2-7 is a waypoint within the non-interference range with other moving apparatuses in the moving direction toward the destination, and the track setting moving apparatus 20-1 moves from the track starting point (=WP1-1) to the determination point (=WP2-7). Furthermore, when the determination point is not the destination, the server 30 updates the track starting point to the determination point (=WP2-7).

The server 30 sets, as the determination point, the waypoint WP2-6 at which the cost value from the updated track starting point (=WP2-7) to the next waypoint is minimized, and performs similar processing. In this case, the closest node to the determination point, that is, the node NDa closest in the traveling direction is the node ND3, and if the moving apparatus 20-2 when the moving time has elapsed is at the position PS2, the node NDb closest in the traveling direction is the node ND6.

Since the node NDb (=ND6) is not included in the node sequence of the node NDa (=ND3) from the node ND2, the server 30 sets the track such that the determination point WP2-6 is a waypoint within the non-interference range with other moving apparatuses in the moving direction toward the destination, and the track setting moving apparatus 20-1 moves from the track starting point (=WP2-7) to the determination point (=WP2-6). Furthermore, when the determination point is not the destination, the server 30 updates the track starting point to the determination point (=WP2-6).

The server 30 sets, as the determination point, the waypoint WP2-5 at which the cost value from the updated track starting point (=WP2-6) to the next waypoint is minimized, and performs similar processing. In this case, the closest node to the determination point, that is, the node NDa closest in the traveling direction is the node ND4, and if the moving apparatus 20-2 when the moving time has elapsed is at the position PS3, the node NDb closest in the traveling direction is the node ND5.

Since the node NDb (=ND5) is not included in the node sequence of the node NDa (=ND4) from the node ND3, the server 30 sets the track such that the determination point WP2-5 is a waypoint within the non-interference range with other moving apparatuses in the moving direction toward the destination, and the track setting moving apparatus 20-1 moves from the track starting point (=WP2-6) to the determination point (=WP2-5). Furthermore, when the determination point is not the destination, the server 30 updates the track starting point to the determination point (=WP2-5).

Hereinafter, if similar processing is performed, a track (WP1-1→WP2-7→WP2-6→WP2-5→WP1-9) having a lower cost than a track using only the own lane (WP1-1→WP1-2→WP1-3→WP1-4→WP1-9) can be set using the other lane without causing a deadlock, a collision, or the like with the moving apparatus-20-2.

Figure 13:
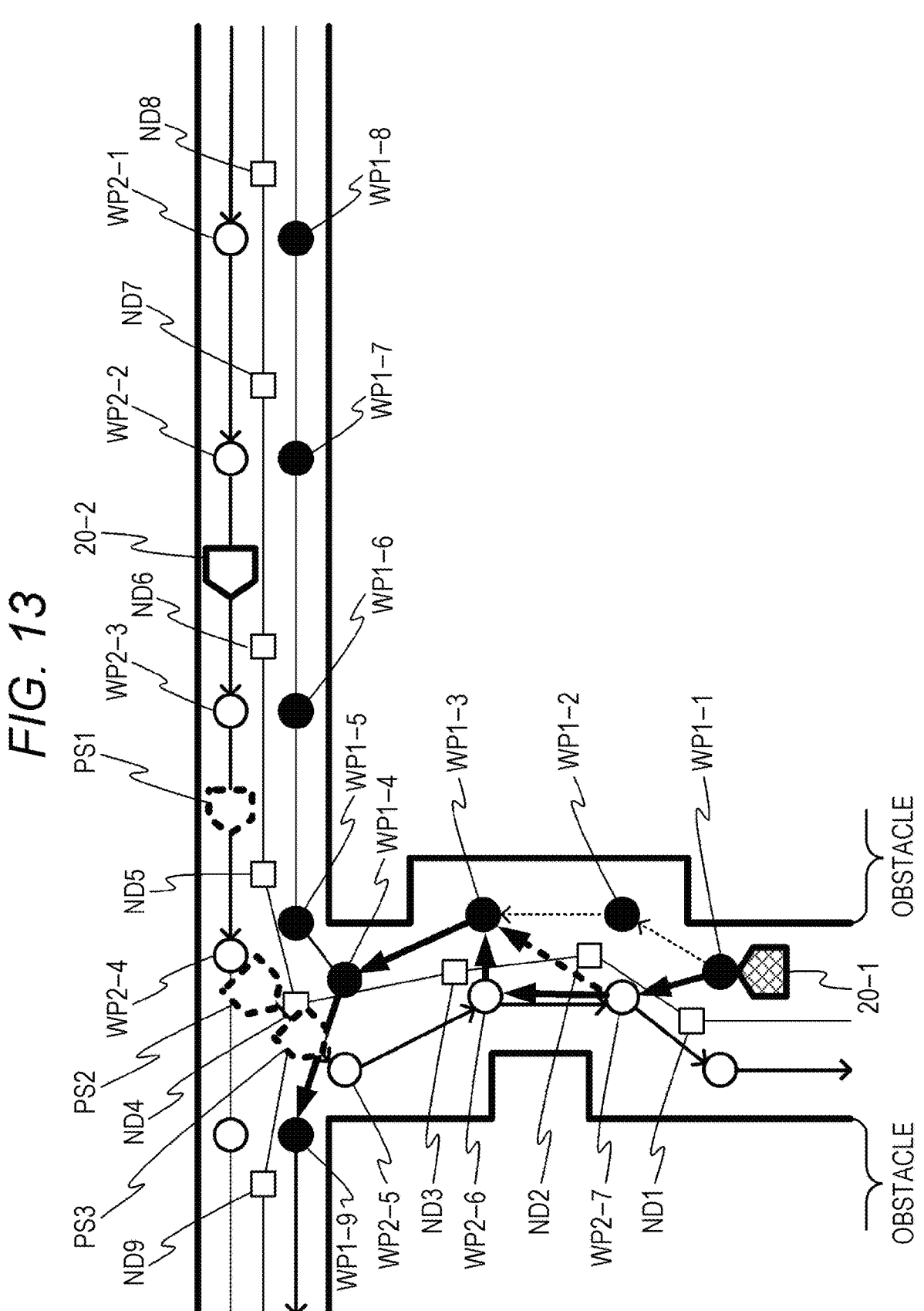
FIG. 13 is a diagram illustrating another specific example of the track plan in a case where lane change is performed.

FIG. 13 illustrates another specific example of the track plan in a case where lane change is performed. The route map generated by the server 30 indicates the nodes ND1 to ND9, the lane map indicates the own lane provided with the waypoint WP1-*n* and the other lane provided with the waypoint WP2-*n*, and the own lane and the other lane are set to be opposite in their moving directions. Furthermore, when the moving apparatus can shorten the moving distance and the moving time by using not only the own lane but also the other lane, the moving apparatus uses the other lane so as not to cause deadlock, collision, or the like with other moving apparatuses. Note that FIG. 13 illustrates a case where the moving apparatus 20-2 is closer than FIG. 12.

For example, the server 30 sets the waypoint WP2-7 at which the cost value to the next waypoint located in the moving direction of the track setting moving apparatus 20-1 is minimized as the determination point with the waypoint WP1-1 as the track starting point.

The server 30 calculates the moving time required for the track setting moving apparatus 20-1 to move from the track starting point to the determination point on the basis of the distance from the track starting point to the determination point and the moving speed (for example, average moving speed) of the track setting moving apparatus 20-1. Furthermore, the server 30 extracts the closest node to the determination point, that is, the node NDa (=ND2) closest in the traveling direction.

Next, the server 30 extracts the node NDb (=ND5) closest in the traveling direction to the position PS1 of the moving apparatus 20-2 when the moving time required for the track setting moving apparatus 20-1 to move from the track starting point to the determination point has elapsed.

Since the node NDb (=ND5) is not included in the node sequence from the node ND1 to the node NDa (=ND2)

closest to the track starting point in the traveling direction, the server 30 sets the track such that the determination point WP2-7 is a waypoint within the non-interference range with other moving apparatuses in the moving direction toward the destination, and the track setting moving apparatus 20-1 moves from the track starting point (=WP1-1) to the determination point (=WP2-7). Furthermore, when the determination point is not the destination, the server 30 updates the track starting point to the determination point (=WP2-7).

The server 30 sets, as the determination point, the waypoint WP2-6 at which the cost value from the updated track starting point (=WP2-7) to the next waypoint is minimized, and performs similar processing. In this case, the closest node to the determination point, that is, the node NDa closest in the traveling direction is the node ND3, and if the moving apparatus 20-2 when the moving time has elapsed is at the position PS2, the node NDb closest in the traveling direction is the node ND4.

Since the node NDb (=ND4) is not included in the node sequence of the node NDa (=ND3) from the node ND2, the server 30 sets the track such that the determination point WP2-6 is a waypoint within the non-interference range with other moving apparatuses in the moving direction toward the destination, and the track setting moving apparatus 20-1 moves from the track starting point (=WP2-7) to the determination point (=WP2-6). Furthermore, when the determination point is not the destination, the server 30 updates the track starting point to the determination point (=WP2-6).

The server 30 sets, as the determination point, the waypoint WP2-5 at which the cost value from the updated track starting point (=WP2-6) to the next waypoint is minimized, and performs similar processing. In this case, the closest node to the determination point, that is, the node NDa closest in the traveling direction is the node ND4, and if the moving apparatus 20-2 when the moving time has elapsed is at the position PS3, the node NDb closest in the traveling direction is the node ND3.

Since the node NDb (=ND3) is included in the node sequence of the node NDa (=ND4) from the node ND3, the server 30 determines that the waypoint WP2-5 is a waypoint not in the non-interference range, and that a deadlock, a collision, or the like with the other moving apparatus 20-2 occurs when the track setting moving apparatus 20-1 moves to the waypoint WP2-5. Therefore, the server 30 sets a track for moving to the own lane and updates the track starting point to a waypoint on the own lane.

For example, the server 30 sets a track whose movement destination is a waypoint (=WP1-3) on the own lane closest to the track starting point (=WP2-6), and sets the waypoint (=WP1-3) of the movement destination as the updated track starting point. Furthermore, in a case where it takes time to switch the moving direction to the waypoint (=WP1-3) of the movement destination in the track setting moving apparatus 20-1 or the like, the server 30 may set the track in which the waypoint (=WP1-3) on the own lane is set as the movement destination from the previous waypoint (=WP2-7) on the track. Furthermore, in a case where the moving apparatus 20-2 is away from the track starting point (=WP2-6), the server 30 may set a track with a waypoint (=WP1-4) on the own lane closest to the determination point (=WP2-7) as a movement destination, and set the track to return to the own lane before occurrence of a deadlock, contact, or the like with the moving apparatus 20-2.

Furthermore, in a case where the passing between the track setting moving apparatus 20-1 and the other moving apparatus 20-2 is completed, the server 30 continues to set the determination point of the minimum cost value and performs the above-described processing.

As described above, the server 30 specifies the non-interference range for the own lane in which the track setting moving apparatus moves and the other lane in which the other moving apparatus moves, determines the waypoint having the highest moving efficiency within the non-interference range in the moving direction toward the destination, sets the track from the track starting point to the passing point having the highest moving efficiency, updates the track starting point to the passing point having the highest moving efficiency, and in a case where the track starting point is on the other lane and the determination point on the other lane is not in the non-interference range, the route/track planning unit 37 sets the track for moving the track starting point to the own lane or the determination point on the own lane and sets the track toward the determination point, so that it is possible to generate a track plan in which the moving apparatus can be efficiently operated using a plurality of lanes.

4. Application Example

The technology according to embodiments of the present disclosure can be applied to various fields. For example, the technology according to embodiments of the present disclosure may be implemented as an apparatus mounted on any type of moving apparatus such as an automobile, an electric vehicle, a hybrid electric vehicle, a motorcycle, a bicycle, a personal mobility, a ship, a robot, and the like. Furthermore, the present invention may be implemented as an apparatus mounted on a device used in a production process in a factory, a device used in a construction field, or a device used in agriculture, forestry, or the like. When applied to such a field, work and the like can be efficiently performed using a plurality of devices even in an environment where the passable region of the moving apparatuses changes according to the work situation.

The series of processing described in the specification can be executed by hardware, software, or a combined configuration of both. In the case of executing processing by software, a program in which a processing sequence is recorded is installed in a memory in a computer incorporated in dedicated hardware and executed. Alternatively, the program can be installed and executed in a general-purpose computer capable of executing various types of processing.

For example, the program can be recorded in advance in a hard disk, a solid state drive (SSD), or a read only memory (ROM) as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-Ray disc (BD) (registered trademark), a magnetic disk, a semiconductor memory card, or the like. Such a removable recording medium can be provided as so-called package software.

Furthermore, in addition to installing the program from the removable recording medium to the computer, the program may be transferred from a download site to the computer wirelessly or by wire via a network such as a local area network (LAN), the Internet, or the like. In the computer, the program thus transferred can be received and installed in a recording medium such as a built-in hard disk or the like.

Note that the effects described in the present specification are merely examples and are not limited, and there may be additional effects that are not described. Furthermore, the present technology should not be construed as being limited to the embodiments of the technology described above. Embodiments of this technology disclose the present technology in the form of exemplification, and it is obvious that those skilled in the art can make modifications and substitutions of the embodiments without departing from the gist of the present technology. That is, in order to determine the gist of the present technology, the claims should be taken into consideration.

Furthermore, the information processing apparatus according to the present technology can also have the following configurations.

(1) An information processing apparatus including a track planning unit that sets a track to a destination by determining a passing point having a highest moving efficiency within a non-interference range with another moving apparatus in a moving direction from a track starting point of a moving apparatus toward the destination, setting a track from the track starting point to the passing point having the highest moving efficiency, and updating the track starting point to the passing point having the highest moving efficiency.

(2) The information processing apparatus according to (1), in which the track planning unit specifies the non-interference range on the basis of a position of the another moving apparatus when the moving apparatus moves from the track starting point to a determination passing point for determining the moving efficiency.

(3) The information processing apparatus according to (2), in which a node is set on a route on which the moving apparatus and the another moving apparatus move, and the track planning unit specifies the non-interference range on the basis of the node closest to the determination passing point in the moving direction and the node closest to the another moving apparatus in the moving direction.

(4) The information processing apparatus according to any one of (1) to (3), in which the track planning unit specifies the non-interference range for an own lane on which the moving apparatus moves.

(5) The information processing apparatus according to (4), in which the track planning unit determines the passing point having the highest moving efficiency on the basis of a result of thinning a passing point.

(6) The information processing apparatus according to (5), in which the track planning unit sets the determination passing point as the passing point having the highest moving efficiency in a case where a moving distance is shortened by thinning a passing point located between the track starting point and the determination passing point for determining the moving efficiency.

(7) The information processing apparatus according to (6), in which the track planning unit sets the determination passing point as the passing point having the highest moving efficiency in a case where there is no obstacle between the track starting point and the determination passing point.

(8) The information processing apparatus according to any one of (1) to (7), in which the track planning unit specifies the non-interference range for an own lane in which the moving apparatus moves and another lane in which the another moving apparatus moves.

(9) The information processing apparatus according to (8), in which the track planning unit determines the passing point having the highest moving efficiency from a passing point on the own lane and a passing point on the another lane included in the non-interference range.

(10) The information processing apparatus according to (9), in which the track planning unit sets a determination passing point for determining the moving efficiency or the track starting point as a passing point on the own lane in a case where the track starting point is on the another lane and a next passing point on the another lane is not in the non-interference range.

REFERENCE SIGNS LIST

10 Moving apparatus control system
20, 20-2 Moving apparatus
20-1 Track setting moving apparatus
21 Sensor unit
22 Surrounding map generation unit
23 Self-position estimation unit
24 Communication unit
25 Track following unit
26 Drive control unit
27 Drive unit
30 Server
31 Communication unit
32 Route map generation unit
33 Lane map generation unit
34 Map storage unit
35 Moving apparatus information storage unit
36 Task planning unit
37 Route/track planning unit

The invention claimed is:

1. An information processing apparatus comprising:
processing circuitry configured to:
generate a track plan for a moving apparatus to a destination by repeatedly executing a process until a determined passing point becomes the destination, the process including:
determining a passing point having a highest moving efficiency within a non-interference range with another moving apparatus in a moving direction from a track starting point of the moving apparatus toward the destination, including:
setting a determination passing point located beyond at least one intermediate passing point relative to the track starting point,
calculating a first moving efficiency for a potential track segment directly connecting the track starting point and the determination passing point,
calculating a second moving efficiency for a track passing through the at least one intermediate passing point between the track starting point and the determination passing point, and
selecting the determination passing point as the passing point having the highest moving efficiency when the first moving efficiency is higher than the second moving efficiency and the potential track segment is determined to be within the non-interference range and free of obstacles,
setting a track from the track starting point to the passing point having the highest moving efficiency, and
updating the track starting point to the passing point having the highest moving efficiency,
wherein the moving apparatus performs movement control so as to move corresponding to the track.

2. The information processing apparatus according to claim 1, wherein the processing circuitry is configured to specify the non-interference range on a basis of a position of the another moving apparatus when the moving apparatus moves from the track starting point to the determination passing point.

3. The information processing apparatus according to claim 2, wherein
a node is set on a route on which the moving apparatus and the another moving apparatus move, and
the processing circuitry is configured to specify the non-interference range on a basis of the node closest to the determination passing point in the moving direction and the node closest to the another moving apparatus in the moving direction.

4. The information processing apparatus according to claim 1, wherein the processing circuitry is configured to specify the non-interference range for an own lane on which the moving apparatus moves.

5. The information processing apparatus according to claim 1, wherein the processing circuitry is configured to specify the non-interference range for an own lane in which the moving apparatus moves and another lane in which the another moving apparatus moves.

6. The information processing apparatus according to claim 5, wherein the processing circuitry is configured to determine the passing point having the highest moving efficiency from a passing point on the own lane and a passing point on the another lane included in the non-interference range.

7. The information processing apparatus according to claim 6, wherein the processing circuitry is configured to set the passing point having the highest moving efficiency to be a passing point on the own lane in a case where the track starting point is on the another lane and a next passing point on the another lane is not in the non-interference range.

8. The information processing apparatus according to claim 1, wherein
the passing point having the highest moving efficiency is determined based on a lane map, and
the lane map is generated based on a route map having number-of-lanes information.

9. The information processing apparatus according to claim 8, wherein the route map is generated by:
performing a Voronoi region division on a movable region map to extract a boundary line, and
generating the number-of-lanes information based on a distance from the boundary line to an obstacle.

10. The information processing apparatus according to claim 1, wherein the highest moving efficiency is determined based on a cost value.

11. The information processing apparatus according to claim 10, wherein the cost value is configured to increase as a moving distance between the track starting point and the determination passing point increases.

12. The information processing apparatus according to claim 5, wherein the another lane is a lane for travel in a direction opposite to a direction of travel for the own lane.

13. The information processing apparatus according to claim 1, wherein the processing circuitry is configured to receive, from the moving apparatus, map information indicating objects in a periphery of the moving apparatus.

14. The information processing apparatus according to claim 1, wherein the track plan comprises a sequential list of waypoints for the moving apparatus to follow.

15. The information processing apparatus according to claim 1, wherein the non-interference range is a range in which no deadlock or collision with the another moving apparatus occurs.

16. The information processing apparatus according to claim 1, wherein the process includes transmitting the track to the moving apparatus.

17. The information processing apparatus according to claim 1, wherein the first moving efficiency is a first moving time, and
the second moving efficiency is a second moving time.

18. The information processing apparatus according to claim 17, wherein the process includes selecting the determination passing point as the passing point having the highest moving efficiency when the first moving time is shorter than the second moving time and the potential track segment is determined to be within the non-interference range and free of obstacles.

19. An information processing method comprising:

generating, by processing circuitry, a track plan for a moving apparatus to a destination by repeatedly executing a process until a determined passing point becomes the destination, the process including:

determining a passing point having a highest moving efficiency within a non-interference range with another moving apparatus in a moving direction from a track starting point of the moving apparatus toward the destination, including:

setting a determination passing point located beyond at least one intermediate passing point relative to the track starting point, calculating a first moving efficiency for a potential track segment directly connecting the track starting point and the determination passing point, calculating a second moving efficiency for a track passing through the at least one intermediate passing point between the track starting point and the determination passing point, and selecting the determination passing point as the passing point having the highest moving efficiency when the first moving efficiency is higher than the second moving efficiency and the potential track segment is determined to be within the non-interference range and free of obstacles, setting a track from the track starting point to the passing point having the highest moving efficiency, and updating the track starting point to the passing point having the highest moving efficiency, wherein the moving apparatus performs movement control so as to move corresponding to the track.

20. A non-transitory computer readable medium storing a program for causing a computer to perform a method, the method comprising:

generating a track plan for a moving apparatus to a destination by repeatedly executing a process until a determined passing point becomes the destination, the process including:

determining a passing point having a highest moving efficiency within a non-interference range with another moving apparatus in a moving direction from a track starting point of the moving apparatus toward the destination, including:

setting a determination passing point located beyond at least one intermediate passing point relative to the track starting point, calculating a first moving efficiency for a potential track segment directly connecting the track starting point and the determination passing point, calculating a second moving efficiency for a track passing through the at least one intermediate passing point between the track starting point and the determination passing point, and selecting the determination passing point as the passing point having the highest moving efficiency when the first moving efficiency is higher than the second moving efficiency and the potential track segment is determined to be within the non-interference range and free of obstacles;

setting a track from the track starting point to the passing point having the highest moving efficiency; and updating the track starting point to the passing point having the highest moving efficiency, wherein the moving apparatus performs movement control so as to move corresponding to the track.

* * * * *